(12) United States Patent
Kergosien et al.

(10) Patent No.: US 8,863,759 B2
(45) Date of Patent: Oct. 21, 2014

(54) COSMETIC ARTICLE INCLUDING AN ELECTROCHROMIC MULTILAYER STRUCTURE

(75) Inventors: Guillaume Kergosien, Chaville (FR); Ludovic Thevenet, Bourg la Reine (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 13/376,444

(22) PCT Filed: Jul. 2, 2010

(86) PCT No.: PCT/IB2010/053058
§ 371 (c)(1),
(2), (4) Date: Feb. 15, 2012

(87) PCT Pub. No.: WO2011/001416
PCT Pub. Date: Jan. 6, 2011

(65) Prior Publication Data
US 2012/0152273 A1  Jun. 21, 2012

Related U.S. Application Data

(60) Provisional application No. 61/213,981, filed on Aug. 4, 2009.

(30) Foreign Application Priority Data

Jul. 3, 2009  (FR) ...................... 09 54604

(51) Int. Cl.
*A45D 29/00* (2006.01)
*A45D 44/00* (2006.01)
*A45D 31/00* (2006.01)
*A45D 44/12* (2006.01)
*G02F 1/157* (2006.01)

(52) U.S. Cl.
CPC .............. *A45D 29/001* (2013.01); *A45D 31/00* (2013.01); *A45D 44/00* (2013.01); *A45D 44/12* (2013.01); *A45D 2029/002* (2013.01); *A45D 2031/005* (2013.01); *G02F 1/157* (2013.01)

USPC .......................... 132/200; 132/73; 132/333

(58) Field of Classification Search
CPC ..... A45D 31/00; A45D 29/00; A45D 29/005; A45D 2031/00; A45D 44/00
USPC ............. 132/73, 333, 200, 212, 163, 273, 53, 132/73.5, 73.6, 75.3, 75.8, 76.5, 285, 319, 132/202, 207, 208, 221; 424/61, 63; 428/29, 1.1, 1.2; 349/115, 175; 345/87; 359/243, 296, 273, 265; 607/88
See application file for complete search history.

(56) References Cited

U.S. PATENT DOCUMENTS 4,654,279 A   3/1987 Bauer et al.
4,792,504 A  12/1988 Schwab et al.
(Continued)

FOREIGN PATENT DOCUMENTS

EP  0 612 826 A1  8/1994
FR  2 811 206 A1  1/2002
(Continued)

OTHER PUBLICATIONS

"Colour Changing Electrochromic Fake Nails," Nov. 5, 2003, Azom.com.*

(Continued)

*Primary Examiner* — Vanitha Elgart
(74) *Attorney, Agent, or Firm* — Oliff PLC

(57) ABSTRACT

A cosmetic device for applying to human keratinous materials, the device including an electrochromic multilayer structure having an electro sensitive stack formed by at least: first and second electrode layers; first and second active electrochromic layers; and an electrolyte layer; and further including: an optically-active layer that is superposed, at least in part, on the electrosensitive stack.

21 Claims, 7 Drawing Sheets

(56) References Cited

U.S. PATENT DOCUMENTS

| | | | |
|---|---|---|---|
| 4,920,991 A * | 5/1990 | Shibahashi et al. | 132/73 |
| 5,729,379 A * | 3/1998 | Allemand et al. | 359/270 |
| 6,194,072 B1 * | 2/2001 | Hambitzer et al. | 428/411.1 |
| 6,377,321 B1 * | 4/2002 | Khan et al. | 349/35 |
| 6,451,294 B1 * | 9/2002 | Simon | 424/63 |
| 7,061,559 B2 * | 6/2006 | Khan et al. | 349/73 |
| 7,884,994 B2 * | 2/2011 | Piroux | 359/270 |
| 8,018,644 B2 * | 9/2011 | Gustavsson et al. | 359/296 |
| 8,289,607 B2 * | 10/2012 | Valentin et al. | 359/265 |
| 2002/0171081 A1 * | 11/2002 | Vincent et al. | 257/40 |
| 2003/0031870 A1 | 2/2003 | Argoitia et al. | |
| 2004/0229049 A1 * | 11/2004 | Boire et al. | 428/432 |
| 2006/0027139 A1 * | 2/2006 | Bujard et al. | 106/31.65 |
| 2007/0139299 A1 * | 6/2007 | Huang et al. | 345/3.1 |
| 2008/0031836 A1 | 2/2008 | Ilekti | |
| 2008/0087291 A1 * | 4/2008 | Jordan | 132/200 |
| 2010/0045924 A1 * | 2/2010 | Powers et al. | 349/190 |
| 2010/0082081 A1 * | 4/2010 | Niessen et al. | 607/88 |
| 2011/0043886 A1 * | 2/2011 | Jeon et al. | 359/273 |
| 2011/0061670 A1 * | 3/2011 | Schneider et al. | 132/200 |
| 2012/0212793 A1 * | 8/2012 | Andersson Ersman et al. | 359/268 |

FOREIGN PATENT DOCUMENTS

| | | |
|---|---|---|
| FR | 2 825 619 A1 | 12/2002 |
| JP | A-2006-230436 | 9/2006 |
| JP | A-2006-262982 | 10/2006 |
| JP | A-2008-168062 | 7/2008 |
| WO | WO 03/098339 A2 | 11/2003 |
| WO | WO 2005/015301 A1 | 2/2005 |
| WO | WO 2008/053549 A1 | 5/2008 |

OTHER PUBLICATIONS

Argun, A.A. et al., "Multicolored Electrochromism in Polymers: Structures and Devices," *Chem. Mater.*, 2004, pp. 4401-4412, vol. 16.

Blonsky, P.M. et al., "Polyphosphazene Solid Electrolytes," *J.Am. Chem.Soc.*, 1984, pp. 6854-6855.

Suga, T. et al., "Photocrosslinked nitroxide polymer cathode-active materials for application in an organic-based paper battery," *Chem. Commun.*, 2007, pp. 1730-1732.

Suga, T. et al., "Cathode- and Anode-Active Poly(nitroxylstyrene)s for Rechargeable Batteries: p- and n-Type Redox Switching via Substituent Effects," *Macromolecules*, 2007, pp. 3167-3173, vol. 40.

International Search Report issued in International Application No. PCT/IB2010/053058 on Nov. 2, 2010.

Written Opinion issued in International Application No. PCT/IB2010/053058 on Nov. 2, 2010.

\* cited by examiner

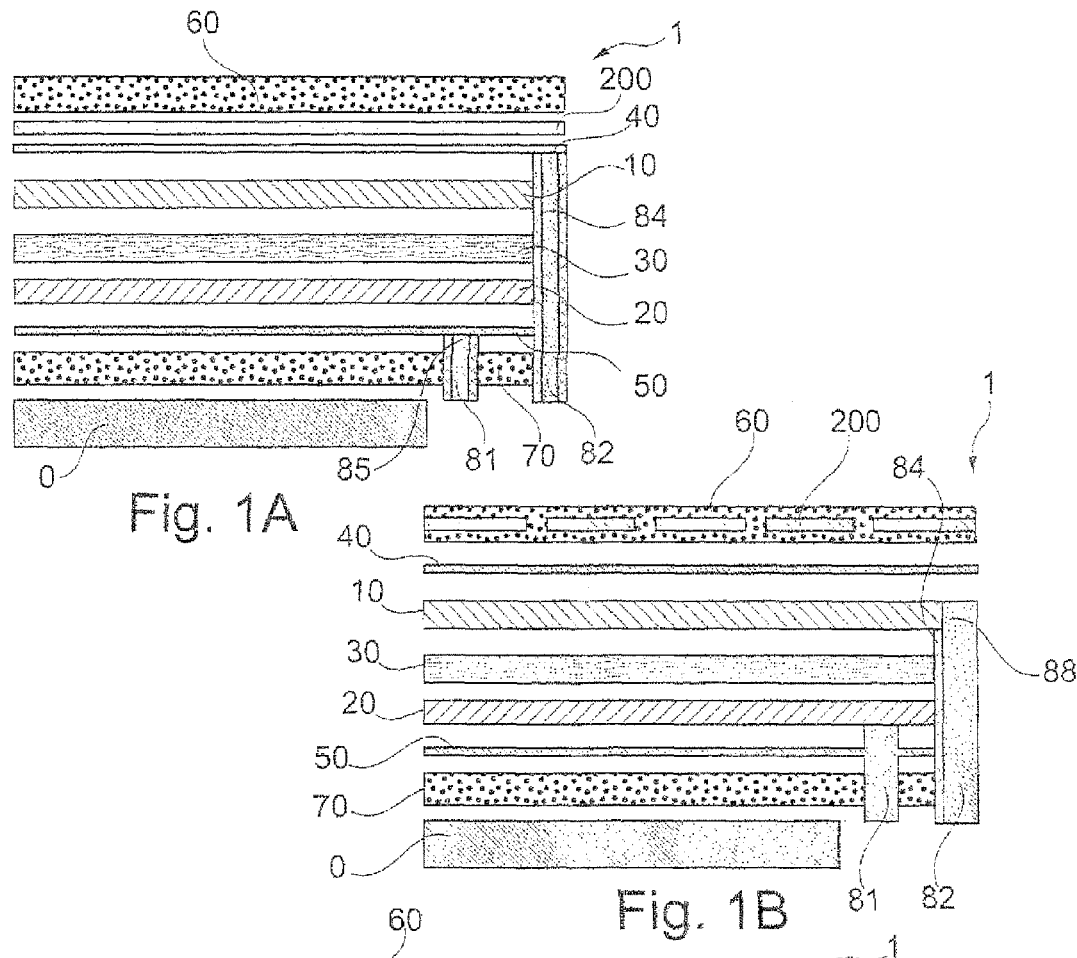
Fig. 1A
Fig. 1B
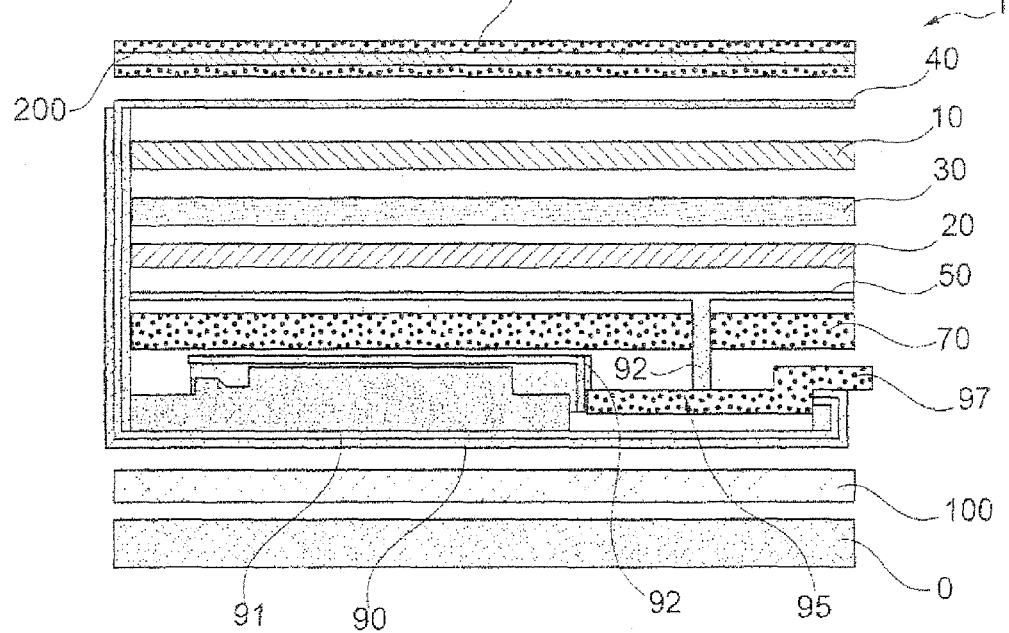
Fig. 2

Without electrical activation

With activation

Without light activation

With light activation

Without activation

With activation

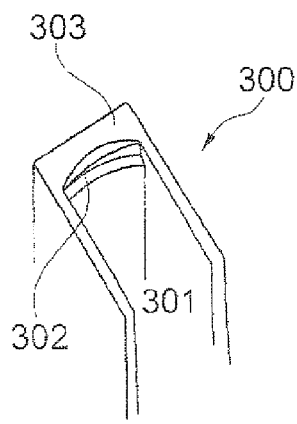
Fig. 8
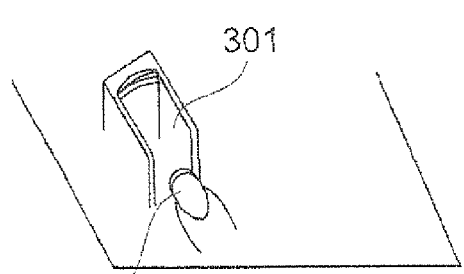
Fig. 9A
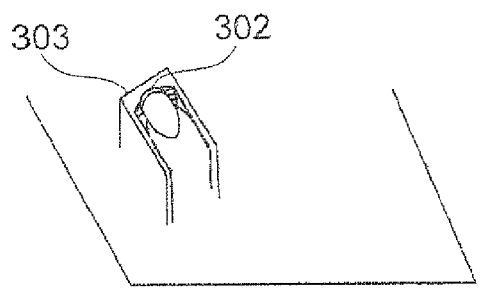
Fig. 9B
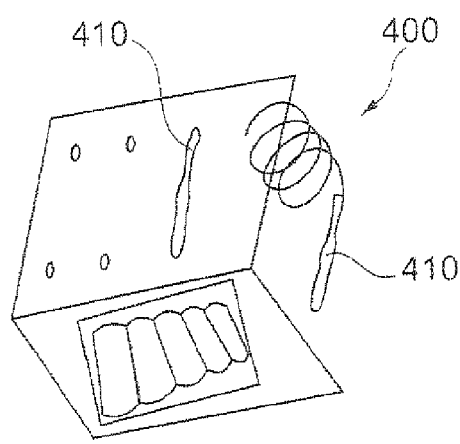
Fig. 10
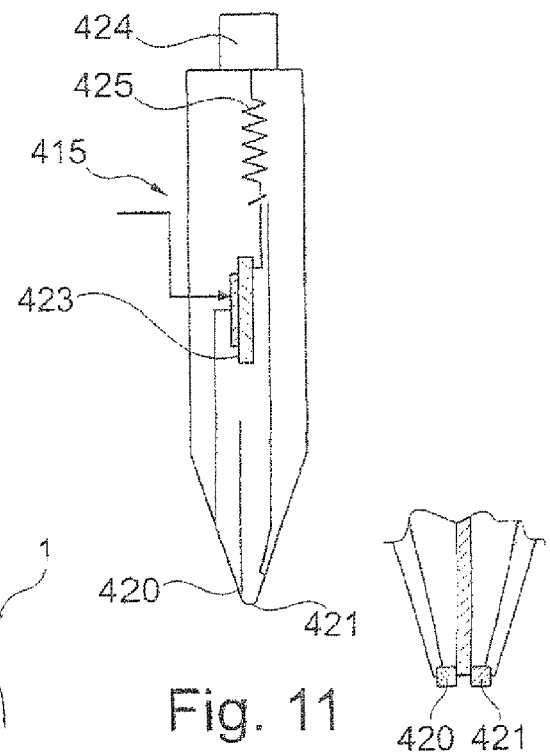
Fig. 11
Fig. 12
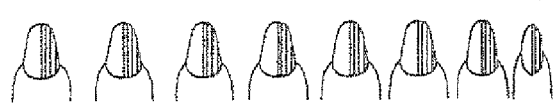
Fig. 13

COSMETIC ARTICLE INCLUDING AN ELECTROCHROMIC MULTILAYER STRUCTURE

TECHNICAL FIELD

The present invention relates to devices for application to human keratinous materials, and more particularly, but not exclusively, to the finger or toe nails.

BACKGROUND OF THE DISCLOSURE

Conventional makeup compositions such as nail varnishes or lipsticks present the drawback of needing to be removed and reapplied if a change of color or of optical effect is desired.

It would be advantageous when clothing, jewelry, or other accessories are changed, also to be able to change the color and/or the optical effects of makeup, but without having to remove makeup completely, and then apply another makeup composition.

In addition, conventional makeup compositions such as nail varnishes or lipsticks present the drawback of not enabling to adjust their color after application. In order to change color, it is necessary to remove the makeup completely, and then apply another makeup composition.

It is known from application FR 2 811 206 to apply electro-optical devices to keratinous materials, which electro-optical devices are capable of changing in appearance by using a source of electricity.

Devices for application to keratinous materials and including a light-emitting layer based on an electroluminescent material have been described. Such devices consume energy and may turn out to be unsuitable for the desired use, e.g. when a sober makeup is wanted.

In particular, FR 2 825 619 describes an adhesive "patch" for application to a keratinous support and including a multilayer structure including an electroluminescent polyconjugated polymer.

WO 2008/053549 relates to a device for application to a nail and including an organic electroluminescent layer or an organic electroluminescent (light-emitting) diode (OLED).

In addition, JP 2006-230436 discloses a device for application to a nail and including microcapsules containing color particles that are capable of migrating under the effect of an electromagnetic field.

Also, JP 2006-262382 discloses a device for application to a nail and including a liquid-crystal display. The device presents the drawbacks that are inherent in using a liquid-crystal display, in particular the fact that the image sent by the screen is visible to a greater or lesser extent depending on the angle at which it is seen.

There is a need to remedy the above-mentioned problems of conventional makeup compositions.

In particular, there is a need to benefit from devices of manufacture and cost chat are compatible with mass production, that are easy to use and to put into place, that are capable of changing in appearance in situ, and/or that are capable of being caused to change into the appearance selected by the user, before or after being placed on keratinous materials.

In addition, and in publication WO 03/098339 in particular, electrochromic devices having a multilayer structure are known for incorporating in glazing. Those multilayer structures comprise two electrode layers with two active electrochromic layers therebetween, separated by an electrolyte layer.

Publications Chem. Mater, 2004, 16, 4401-4412, Multicolored Electrochromism in Polymers: Structures and Devices and Combined Electrochromic and Plasmonic Optical Responses in Conducting Polymer/Metal Nanoparticle Films, New Materials Department, CIDETEC—Center for Electrochemical Technologies, Parque Technologico de San Sebastian, Paseo Miramon 196, E-20009 Donastia-San Sebastian, Spain, incorporated herein by reference, disclose other possible configurations for electrochromic structures.

SUMMARY OF THE DISCLOSURE

The invention seeks to propose novel makeup devices that make it possible to produce novel effects.

Exemplary embodiments of the invention provide a cosmetic device for applying to human keratinous materials, the device including an electrochromic multilayer structure comprising an optionally-homogeneous electrosensitive stack formed by at least;
   first and second electrode layers;
   first and second active electrochromic layers; and
   an electrolyte layer;
and further including:
   an optically-active layer that is superposed at least in part, on the electrosensitive stack.

The device may be configured to be fastened on a nail, and may be applied on an optionally made-up nail, or even on a false nail. The device may be for applying to a nail, e.g. as a false nail, or it may be fitted on a false nail.

In general, in these exemplary embodiments of the invention and throughout the specification below, the electrode layers may optionally be distinct from the active electrochromic layers.

An active electrochromic layer is a layer that does not emit light and chat has a color that may vary under the effect of electrical excitation, since the light absorption of the layer is changed. Such a layer differs from an electroluminescent layer that emits light. An electrochromic layer is not visible in the absence of incident light, whereas an electrically-activated electroluminescent layer is. The variation in color of the electrochromic layer is linked to a change in the distribution of electrons within at least one compound of the layer.

The electrochromic effect is different from chains of molecules aligning under the effect of an electrical field, as happens with liquid crystals, and it is different from particles migrating under the effect of an electromagnetic field, as happens with microcapsules.

An "optically-active" layer is a layer whose presence within the electrochromic multilayer structure leads to a change in the visual appearance of the structure compared with the appearance that the structure presents in the absence of the optically-active layer, in at least one of the (excited or non-excited) states of the structure.

The optically-active layer may be selected from: a layer including an effect pigment; a colored layer; a luminescent layer, e.g. fluorescent or phosphorescent layer; a photochromic layer; makeup deposited on keratinous materials; or printing.

The electrode layers are preferably non porous.

A single electrode layer preferably does not include both anodes and cathodes.

The electrolyte layer is electrically connected to the first and second active electrochromic layers, e.g. being in contact therewith, at least in part. In particular, the electrolyte layer may be sandwiched between the first and second active electrochromic layers.

Each of the active electrochromic layers is electrically connected to one of the electrode layers, e.g. being in contact therewith, at least in part. In particular, the first and second active electrochromic layers may be sandwiched between the first and second electrode layers.

In preferred embodiments, the active electrochromic layers and/or the electrolyte layer do not have liquid crystals and do not have microcapsules encapsulating particles that are suitable for moving under the effect of an electromagnetic field.

The optically-active layer may optionally be distinct from one of the layers of the electrosensitive stack as defined above, in particular it may be optionally distinct from the first, and second active electrochromic layers.

By way of example, the optically-active layer may be situated above the electrosensitive stack. In a variant, the optically-active layer may be situated between two layers of the electrosensitive stack. Alternatively, the optically-active layer may be situated beneath the electrosensitive stack. The optically-active layer may be formed of a mask as defined below.

The optically-active layer may optionally be colored, and may be useful for changing the appearance of the device.

The optically-active layer may be luminescent or photochromic, and the electrosensitive stack may, as a function of its electrical, excitation, block, to a greater or lesser extent, at least one optical-excitation wavelength of the optically-active layer. Excitation of the optically-active layer may thus be controlled by means of the electrosensitive stack, thereby offering novel possibilities for combining effects.

The optically-active layer may extend over the entire extent of the stack, or it may be discontinuous and form at least one pattern, for example.

The optically-active layer may include an interference pigment and/or a liquid crystal. The visibility of the interference pigment and/or of the liquid crystal may depend on the excitation of the electrosensitive stack. For example, when the interference pigment or the liquid crystal is situated on the electrosensitive stack or within, it, the electrosensitive stack may change an observed color path and/or make the pigment or the liquid crystal visible to a greater or lesser extent by forming a background that is dark to a greater or lesser extent beneath the pigment or liquid crystal.

By way of example, the thickness of the optically-active layer lies in the range 1 micrometer ($\mu m$) to 100 $\mu m$, preferably in the range 5 $\mu m$ to 30 $\mu m$.

Where appropriate, the optically-active layer may be deposited by the user on the surface of the multilayer structure, or, where appropriate, it may be deposited by printing with a particular pattern.

By way of example, the optically-active layer may be deposited on a removable protective layer of the multilayer structure.

The optically-active layer may be makeup that is deposited on the keratinous materials, and then covered by the electrochromic multilayer structure.

A Contrast Effect

The optically-active layer may be disposed in such a manner as to create a contrast effect with at least one region of the electrosensitive stack.

The term "contrast effect" should foe understood to mean that the contrast between two visible regions of the device is changed as a function of the excitation of the electrochromic device. This makes it possible to make a region visible to a greater or lesser extent depending on the state of the device, or to change the color that is seen by the observer. Certain colors may appear saturated to a greater or lesser extent as a function of surrounding color.

In the meaning of the invention, the term "region" should be understood to mean a fraction of the structure when it is seen from above. Thus, two superposed layers do not constitute two regions in the meaning of the invention.

Such an optically-active layer may include an effect pigment selected, for example, from interference pigments and metal particles.

An "effect" pigment is a pigment whose presence within the electrochromic multilayer structure leads to a change in the visual appearance of the structure relative to the appearance of the structure in the absence of an effect pigment, in at least one of the (excited and non-excited) states of the structure.

An effect pigment may in particular be selected from: interference pigments, e.g. goniochromatic pigments or pearlescent pigments such as nacres; metal particles, in particular reflective particles; liquid crystals; pigments having a diffraction grating; and mixtures thereof.

One of the active electrochromic layers may include an effect pigment. A single layer may thus form both an active electrochromic layer and an optically-active layer.

The optically-active layer may be situated on top of the electrosensitive stack and may, for example, outline a pattern on its surface. In this circumstance, the contrast of the pattern with its surroundings depends on the excitation state of the electrochromic multilayer structure.

The optically-active layer may alternatively be situated beneath the electrosensitive stack.

In certain, exemplary embodiments, the electrosensitive stack may be capable, as a function of its electrical excitation, of taking on substantially the same color as the optically-active layer. This makes it possible to change the visibility of a pattern formed by the optically-active layer, depending on the excitation state of the device.

The optically-active layer may be deposited on a removable protective layer of the electrochromic multilayer structure.

An Optically-Active Layer Including an Interference Pigment or a Liquid Crystal

The optically-active layer may include an interference pigment or a liquid crystal, the electrochromic multilayer structure being situated beneath the optically-active layer.

The electrochromic multilayer structure may act as a background of color or of opacity that varies, making it possible to make the optically-active layer covering it visible to a greater or lesser extent.

By way of example, the electrochromic multilayer structure may display firstly a dark stare and secondly a light or transparent state, as a function of its electrical excitation. In the dark state, the color(s) of the optically-active layer appear clearly, whereas in the light state, the color (s) are more difficult to see.

The optically-active layer may include a nacre, a goniochromatic pigment, or a liquid crystal, in particular selected from those having low visibility on a light background, e.g. iridescent pigments.

The optically-active layer may cover the electrochromic structure entirely, or it may outline a pattern on its surface.

A Non-Homogeneous Multilayer Structure

The electrochromic multilayer structure may comprise a non-homogeneous electrosensitive stack of at least:
  the first and second electrode layers;
  the first and second active electrochromic layers; and
  the electrolyte layer between the active electrochromic layers.

The term "non-homogeneous" should be understood to mean that in at least two locations of the electrosensitive stack, when said stack is observed from above, the stack does not have exactly the same structure.

For example, at least one of said layers may extend in non-homogeneous manner within the stack, e.g. having a composition and/or thickness that varies, with the thickness possibly varying in continuous or discrete manner, where appropriate, and possibly being zero locally. By way of example, the thickness of the layer may vary by at least 20%, or even by at least 50% or more. The layer may be an electrolyte layer, an active electrochromic layer, or an electrode layer.

The non-homogeneity of the electrosensitive stack makes it possible to obtain various appearances that are advantageous in cosmetics, e.g. at least one shading or s decorative pattern, in particular graded color.

At least one of the active electrochromic layers may present at least two regions of different respective thicknesses, e.g. a region having a non-zero thickness e, and a region having a zero thickness. Depending on the shape of the outline of one of the regions, it is possible to obtain various patterns. By way of example, an active electrochromic layer may present two regions having thicknesses that differ by more than 20%, better by more than 50%.

At least one layer of the electrosensitive stack may extend with thickness that is not constant over the extent of the stack. The thickness may vary along one dimension X or along two dimensions X and Y of the stack. The thickness is measured along a dimension Z that is locally perpendicular to X and Y.

The thickness of at least one layer may vary in progressive manner from one location to another of the layer. The thickness may be zero in at least one location. The layer having thickness that varies may be discontinuous. The disjoint regions of the layer may optionally have different compositions, so as to produce different colors, where appropriate.

Each of the layers of a same type, e.g. the active electrochromic layers, may present both regions having a non-zero thickness and regions having a zero thickness. Non-zero-thickness regions of the two active electrochromic layers may be superposed exactly, within the electrosensitive stack, when said stack is observed from above.

The zero-thickness regions of the active electrochromic layers may be superposed wish one or more zero-thickness regions of the electrolyte layer and/or of the electrode layers. By way of example, the zero-thickness regions are formed by removing material or by depositing at least one material of the electrosensitive stack in selective manner.

At least one of the active electrochromic layers may present thickness that varies between two locations of the layer, e.g. thickness that decreases in linear manner between the locations, which, amongst others possibilities, may coincide with, edges of the electrosensitive stack. Only one of the active electrochromic layers may have a varying thickness, or, in a variant, both of the active electrochromic layers may have varying thicknesses, e.g. the thickness changing by decreasing or by increasing in a single direction. For a given location of the stack, when said stack is observed from above, the two active electrochromic layers may optionally present the same thickness.

The thickness of the electrolyte layer may also vary, e.g. in linear manner, from one location to another of the stack, independently of whether or not the thickness of the other layers of the electrosensitive stack varies. By way of example, an electrolyte layer of thickness that varies may be situated between two homogeneous active electrochromic layers, in particular each of constant thickness.

Any of the electrode layers, the active electrochromic layers, and the electrolyte layer, may present regions of zero thickness and of non-zero thickness so as to form a discontinuous stack, e.g. making it possible to create one or more patterns.

At least one of the electrolyte layer and of the active electrochromic layers may have a composition that is not homogeneous. For example, the electrolyte layer and/or at least one active electrochromic layer may present regions having different respective compositions. For example, at least one of the active electrochromic layers may comprise a first region comprising a first polymer, and a second region comprising a second polymer that is different from one first. The polymers may be selected so as to create differences in color, for example.

The electrolyte layer may comprise regions having different compositions, disposed between homogeneous active electrochromic layers. For example, the electrolyte layer comprises at least two regions that are made of different materials.

Regions of different compositions in a single layer of the electrosensitive stack may optionally be of the same thickness.

The electrochromic device may include at least one shield that is disposed between two layers of the electrosensitive stack for locally creating a change in the interaction between the layers. By way of example, the shield is made of polymethyl methacrylate (PMMA) or of polyethylene terephthalate (PET).

The shield may extend between the electrolyte layer and an active electrochromic layer.

The shield may, as a function of its shape, or of a variation in its thickness, or of its composition, form at least one pattern, the visibility of which depending on the excitation state of the electrochromic device for instance. The shield may be made by transfer, printing, or etching, amongst other possibilities. The shield may optionally be transparent. For a transparent shield, a pattern defined by the shield may appear while the device is being excited.

By way of example, the thickness of the shield lies in the range 1 μm to 100 μm, preferably in the range 5 μm to 30 μm.

A Multilayer Structure Associated with a Mask

The multilayer structure may include at lease one mask making it possible to form at least one pattern.

Where appropriate, the mask may coincide with the optically-active layer.

The mask may optionally be colored, optionally be opaque, and may be continuous or discontinuous.

The mask may be reflective.

The mask may be external to the electrosensitive stack.

The mask may form at least one pattern having visibility that may depend, on the excitation state of the electrochromic device.

A very fashionable nail makeup effect known as a "French manicure" consists in applying makeup, preferably of light color, only to the ends of the nails, so as to give the impression of a clean and natural result. However, that type of makeup effect may sometimes present the drawback of appearing too sophisticated. Consequently, it would be advantageous to be able to make the makeup effect disappear and reappear as desired, but without having to remove the makeup. The electrochromic device may thus be arranged so as to create a change in color at the end of a nail, e.g. in the shape of a crescent, so as to simulate that type of makeup effect. The outline of the electrosensitive stack may be crescent shaped. In a variant, a mask is used to mask, in part, the electrosensitive stack, and to define a pattern that is crescent shaped.

The electrosensitive stack may be made in such a manner that, as a function of its electrical excitation, it displays a color close to that of the mask. When a color is said to be "close" that should be understood to mean that the distance ΔE between them in the 1976 CIE Lab color space is less than or equal to 1.5. Thus, the visibility of the mask may depend on the electrical excitation of the electrochromic device.

By way of example, the mask may be fitted on the multi-layer structure before or after said structure is fastened on the nail, or it may be integrated in a support layer adjacent to an electrode layer.

The mask may be formed by printing, transfer, or etching, amongst other possibilities.

By way of example, the mask may be made by ink-jet printing on a multilayer structure that is placed on the nail or that is ready to be placed on the nail.

Where appropriate, the mask is printed on a removable film, making it possible to remove the mask so as to replace it by another mask, of different pattern.

When the mask is integrated in a support layer, the mask is laminated between two films forming the support layer, for example.

The mask may include a pigment or coloring, a metal layer, a polymer film, and, where appropriate, it may include microrelief for creating optical effects, for example.

By way of example, the thickness of the mask lies in the range 1 μm to 100 μm, preferably in the range 5 μm to 30 μm.

When the mask is not completely opaque, the mask may act as an optical filter, e.g. so as to control the light reaching the underlying layers.

Electrical Contacts

The device may include electrical contacts, with at least one of said contacts being disposed on a distal portion of the device, extending in front of the nail, e.g. on a bottom face of the device. At least one of the contacts may also be disposed on an edge of the device, at its distal end.

Such a disposition of the contacts makes it possible to avoid detracting the appearance of the nail.

The multilayer structure may include an electrosensitive stack as defined above, which may be optionally-homogeneous, and may optionally be provided with a mask as defined above.

At least one of the contacts may extend over a height that is greater than the thickness of an electrode layer of the electrochromic multilayer structure. This makes it easier to power via an electrical terminal against which it bears.

One of the contacts may be disposed on a bottom face of the device, and the other on its edge, at its distal end. This makes it easier to power the device by enabling the user to position a finger easily against electrical power-supply terminals.

The device may include an electrosensitive stack comprising active electrochromic layers, electrode layers, and an electrolyte layer, and said contacts may be connected, optionally directly, to the respective electrode layers.

The electrochromic device may include at least one electrical circuit that is connected electrically to at least one of said contacts. By way of example, the electrical circuit is configured to make it possible to select an excitation level for the electrosensitive stack, and it may be a simple touch-sensitive switch and/or a potentiometer for a more complex electronic circuit, e.g. configured to change the excitation of the electrosensitive stack cyclically.

Integrated Energy Source

The device may include an integrated energy source.

The energy source may comprise a battery, a rechargeable battery, a capacitor, and/or a coil. The energy source may be flexible or rigid.

The energy source, may power the electrosensitive stack permanently, e.g. for a duration that is greater than 1 hour (h), better greater than 4 h, and possibly until it is flat. In a variant, power may be supplied in selective manner, e.g. by means of a switch that is controlled by the user.

A removable insulating tab may insulate at least one terminal from the energy source before first use.

Multiple Polymers Within a Single Layer

With a multi-layer electrochromic structure comprising:
electrode layers;
active electrochromic layers; and
an electrolyte layer between the active electrochromic layers;

at least one of the electrolyte layer and of the active electrochromic layers may comprise at least first and second materials, in particular polymers.

The polymers may be selected from electrochromic polymers.

The first and second materials may be juxtaposed, and, by way of example, each may correspond to a region that shows a pattern. The first and second materials may optionally be disjoint.

The first and second materials may be in contact electrically.

The first and second materials may be mixed together, e.g. so as to create intermediate colors between the colors that are associated with the materials, in particular polymers, that are mixed together.

Adaptation of the Device

In general, the electrochromic device may be carried by a false nail made of plastics material, e.g. false nails of the type available from numerous suppliers of manicure salons. Conventionally-used false nails present long lengths and should generally be cut before use. Before depositing the electrochromic multilayer structure on such a false nail, e.g. by coating for at least some layers, the false nail may be cut, e.g. in such a manner that the difference between the length and the width of the false nail lies in the range 0.6 centimeters (cm) to 1.2 cm, preferably in the range 0.7 cm to 1.1 cm, and preferably in the range 0.8 cm to 1.0 cm. The width of the false nail may lie in the range 0.7 cm to 1.3 cm, for example.

Protection

The device may include a peelable protective layer, or even a plurality of peelable layers. The device may also carry a non-peelable protective layer.

Applying Makeup

The invention also provides a method of applying makeup to human keratinous materials, e.g. the nails, the skin, or the lips, wherein an electrochromic device made in accordance with at least one ox the above-defined exemplary embodiments of the invention are applied to said materials.

The keratinous materials receiving the device may be made-up before the device is placed thereon.

In a variant, the device and the keratinous materials are covered with a makeup composition after the device is placed on the keratinous materials.

BRIEF DESCRIPTION OF THE DRAWINGS

The invention can be better understood on reading the following detailed description of non-limiting embodiments thereof, and on examining the accompanying drawings, in which:

FIGS. 1A and 1B are diagrams showing two examples of electrochromic multilayer structures made in accordance with certain exemplary embodiments of the invention and having an external power supply;

FIG. 2 shows another example of an electrochromic multilayer structure having an integrated power supply;

FIG. 8 shows an example of a power-supply device for electrically exciting an electrochromic multilayer structure and/or for transmitting information thereto;

FIGS. 9A and 9B show the FIG. 8 device in use;

FIG. 10 shows an example of a display unit for displaying various electrochromic multilayer structures to consumers;

FIG. 11 shows an example of a power-supply device in a variant embodiment of the invention;

FIG. 12 shows a detail of FIG. 11; and

FIG. 13 shows a range of electrochromic multilayer structures of various sizes.

Figure 3A:
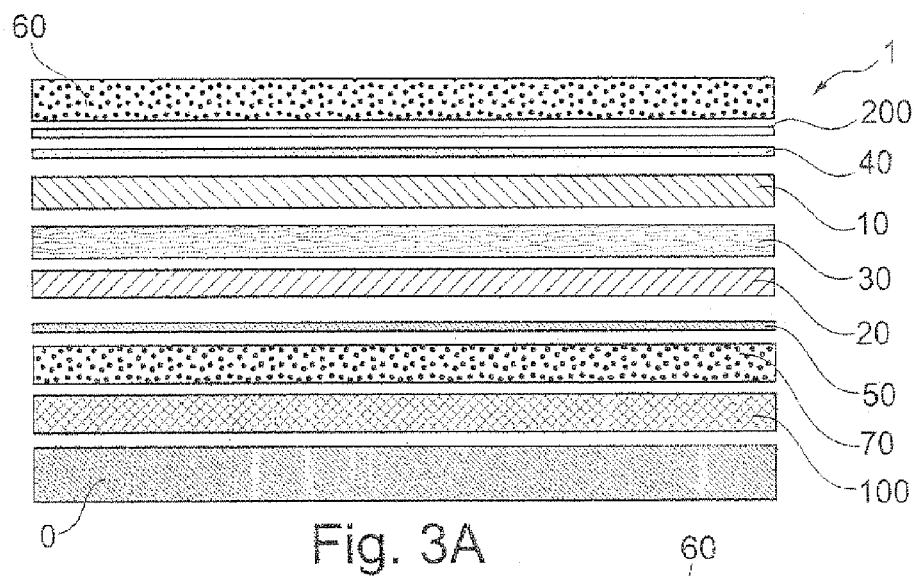
FIGS. 3A and 3B are diagrams showing examples of fastening an electrochromic multilayer structure to a finger or toe nail.

In the drawings, different layers that are in contact with one another are sometimes shown spaced apart for the purpose of clarity. The real relative proportions of the component elements of the various devices shown are not always complied with, again for the purpose of clarity in the drawings.

DETAILED DESCRIPTION

As -shown in FIGS. 1A and 1B in particular, an electrochromic device 1 of the invention may include first and second active electrochromic layers 10 and 20 that are separated by an electrolyte layer 30 with which they come into contact.

As shown in FIGS. 1A and 1B in particular, the device 1 may also include first, and second electrode layers 40 and 50 that are disposed on either side of the stack formed by one active electrochromic layers and by the electrolyte layer, and that come into contact respectively with the first and second active electrochromic layers on their face remote from the electrolyte layer 30.

By way of example, the electrode layers 40 and 50 are coatings of a transparent electrically-conductive material, e.g. indium tin oxide (ITO), the coatings being supported by respective support layers 60 and 70, e.g. made out of a transparent, optionally-colored, thermoplastic material, e.g. PET. Each of the support layers 60 and 70 may be constituted by a single flexible film, or, in a variant, by an assembly of a plurality of flexible films that have been laminated together. The flexible films may advantageously present flexibility that enables them to be folded in half without breaking.

The support layers 60 and 70 preferably present thickness that is less than 100 µm, preferably less than 70 µm. Thus, during application, the electrochromic device may be capable of following the contours of the application zone, e.g. the finger nails or the lips. Thus, the electrochromic multilayer structure may be flexible enough to adapt to the curve of the nail.

The thickness of the electrode layers, e.g. of the above-mentioned ITO coating may lie in the range 50 nanometers (nm) to 1000 nm.

By way of example, the transparent electrically-conductive material uniformly covers the support layers 60 and 70 in uniform manner, but this could be different, e.g. in order to create patterns or to enable selective excitation of certain zones of the structure, as described below.

In order to make the electrode layers, it is possible to use materials other than ITO, e.g. gold and silver. Gold is the metal that performs best, and it also presents numerous advantages (elasticity, electrochemical stability, . . . ).

In order to make the support layers, it is possible to use materials other than PET, e.g. PMMA.

The thickness of an active electrochromic layer 10 or 20 may lie in the range 50 nm to 1000 nm.

The thickness of the electrolyte layer 30 may lie in the range 50 nm to 1000 nm.

The multilayer structure also includes an optically-active layer 200, e.g. situated above the electrosensitive stack, as described below in the description of FIGS. 6A to 6E. The optically-active layer is sometimes shown with gaps, and sometimes without gaps. An example with gaps may be replaced by an example without gaps.

FIGS. 1A to 5L show an optically-active layer 200 with an example of positioning, but the positioning may be changed into any one of the positions in FIGS. 6A to 6E.

The electrochromic multilayer structure 1 may be worn on a nail O, as shown. It may be fastened to the nail in various ways, as described below. However, the invention is not limited to making-up nails.

The stack of electrode, active electrochromic, and electrolyte layers constitutes an electrosensitive stack that is capable of changing in appearance in response to electrical excitation.

The electrochromic multilayer structure may be electrically excited temporarily, merely to change the appearance of the electrochromic multilayer structure, or permanently, i.e., for the entire duration the device is being used, depending on the multilayer structures used.

The electrochromic multilayer structure may preserve its appearance once electrical excitation ceases, or it may change in appearance once electrical excitation ceases. One of the means for preserving the effect after electrical excitation relies on using low-conductivity electrolyte polymers, thereby slowing down the phenomenon of the electrochromic layers relaxing. Conventional solid electrolytes that are based on polyethylene oxide (PEO) or even polypropylene oxide (PPO), and that present quite low conductivity ($10^{-2}$ Siemens per centimeter (S/cm)) may thus be used. With this kind of material, only the amorphous phase provides conduction. If the vitreous transition temperature is changed by reducing the crystallinity index of the material, and also by using molecular weights that are smaller, then the conductivity of the solid electrolyte is increased (but with a loss of mechanical properties).

Various articles teach how to modulate the conductivity of solid electrolytes by incorporating plasticizers.

The article by P. M. Blonsky and D. F. Shriver, J. Am. Chem. Soc. 1984.106, pages 6854-55, describes a polymer of poly(bis(methoxy ethoxy)phosphasene) type that incorporates short chains of PEO having ionic conductivity at 25° C. that exceeds $10^{-5}$ S/cm.

In U.S. Pat. No. 4,654,279, Bauer et al describe a solid polymer electrolyte that is constituted by two interpenetrating phases; a cross-linked inert solid phase and a liquid polymer phase (polyether of low molecular weight) of good, ionic conductivity ($>10^{-4}$ S/cm). The relative proportions of the cross-linked phase and of the liquid phase are selected in such a manner as to combine the good mechanical and electrochemical, properties. The ionic conductivity of the electrolyte is about $10^{-4}$ S/cm at ambient temperature.

In U.S. Pat. No. 4,792,504 by G. Schwab and M. T. Lee, there is disclosed a solid electrolyte having a liquid-phase supporting matrix that is constituted by PEO that is cross-linked by a compound of polyacrylate type. The liquid in which a metal salt is dissolved, is a polyether of low molecular weight or an aprotic solvent.

The embodiments in FIGS. 1A and 1B are suitable for being electrically exerted temporarily, e.g. by means of electrical conductors 81 and 82 that are connected respectively to the electrode layers 50 and 40. The electrical energy source is external to the device.

The electrical conductors 81 and 82 may pass through the various layers of the stack, and, when necessary, they may be insulated electrically by respective insulating layers 84 and 85, e.g. in the form of insulating sheaths.

In the embodiment in FIG. 1A, the electrical conductors 81 and 82 are for contacting a power supply via their bottom ends that are situated in front of the nail O, on the bottom face of the electrochromic multilayer structure 1. Thus, in numerous situations, the bottom ends of the electrical conductors serving as contacts are barely visible, if at all, by the entourage of the person wearing the device. The electrical conductors 81 and 82 may be made by means of: metal conductor wires or strips; deposits of a metal, of polymer, or of an electrically-conductive ink; or in some other way, e.g. by extending the electrode layers out from the electrosensitive stack.

The variant embodiment in FIG. 1B differs from the embodiment in FIG. 1A in the way in which the electrical conductors 81 and 82 are made, e.g. the conductor 81 not having an electrically-insulating sheath, whereas the conductor 82 includes electrical insulation 84 that extends only on the side of the electrode layer 50, for example, thereby offering the possibility of powering the conductor 82 not only via the bottom face of the electrochromic device 1, but also via its distal end edge 88. In a variant, the conductor 82 has an electrically-insulated bottom end, and can be powered only via its face lying at the distal end edge 88.

FIG. 1B shows the possibility of the electrical conductors 81 and 82 being made with conductive materials that extend up to the respective active electrochromic layers 20 and 10.

As described above, the electrochromic multilayer structure 1 may also include an integrated energy source, thereby making it possible, for example, to subject it to a voltage that is constant or that changes in predefined manner while it is being worn by the user, one voltage changing in accordance with a program stored in a processor embedded in the electrochromic multilayer structure, for example, or depending on the state of a digital or analog oscillator circuit, e.g. of the multivibrator type, e.g. referenced NE555D. The presence of an integrated energy source also makes it possible to use an electrosensitive stack in which the change in appearance in response to electrical excitation exists for only as long as the electrical excitation lasts.

In the embodiment of FIG. 2, an integrated energy source 90 is connected to the electrode layers 40 and 50 via electrical conductors 91 and 92, possibly, and as shown, using an electronic circuit 95 that may include, or be constituted by a control and/or adjuster member 97, e.g. a potentiometer and/or a switch, that is suitable for being actuated by the user so as to change at least one operating characteristic of the device, e.g. switching the device on or off, or so as to change at least one operating parameter, e.g. a frequency for changing appearance, and/or the amplitude of the excitation voltage of the multilayer structure.

The switch and/or potentiometer may be accessible from the bottom face of the device, in front of the nail, or at its distal end.

The device may be made available, within a single package, together with an accessory that makes it possible to operate the control or adjuster member.

The electronical circuit 95 may possibly have one or more sensors integrated, therein, which sensors are sensitive to external stimulus, e.g. sensitive to light, humidity, and/or temperature. For example, the color of the electrochromic multilayer structure may vary as a function of humidity, temperature, or ambient light by means of an electronic circuit that changes the excitation voltage of the electrochromic multilayer structure as a function of the output from a humidity, temperature, or light sensor.

By way of example, the energy source 90 is of the battery or capacitor type, and may be made by printing, where appropriate. An electrical energy source of the paper battery type, e.g. referenced SOFT BATTERIE®, may be used that makes it possible to generate a voltage in the range about 2.5 volts (V) to 3 V as a function of area, for thickness of about 400 µm, for example. Such a battery may use a paper-based electrolyte between an anode and a cathode that are made respectively of aluminum or zinc (for the anode) and of magnesium oxide (for the cathode).

The integrated energy source may also be of the type described in the articles: "Photo-Crosslinked Nitroxide Polymer Cathode Leading to an Organic-Based Paper Battery", Chem. Commun., 2007, 1730-1732 by T. Suga, H. Konishi, H. Nishide; or "Cathode- and Anode-Active Poly(nitroxylstyrene)s for Rechargeable Batteries; P- and N-Type Redox Switching via Substituent Effects", Macromolecules, 2007, 40, 3167-3173 by T. Suga, Y.-J. Pu, S Kasatori, H. Nishide; these articles being incorporated herein by reference. Such a battery functions on a principle of oxidation reduction, and may be in the form of a film having thickness of 200 nm.

When the device includes an integrated energy source, the excitation voltage of the electrochromic multilayer structure may be constant, or it may vary in numerous ways over time, e.g. in steps or in one or more ramps, e.g. of triangular shape, or even in sinusoidal manner. Alternatively, the excitation voltage may be substantially constant while the device is powered, and decrease as the energy source progressively runs flat.

The integrated energy source may also include a photovoltaic cell or a mechanism that draws its energy from the movements of the user.

The voltage applied to the electrosensitive stack may depend on a timer, e.g. for switching off the device after a predefined duration, or it may depend on at least one signal coming from a sensor that is sensitive to a stimulus, e.g. a light sensor, as mentioned above.

Where appropriate, the device may include an electronic circuit that is configured to read information remotely, e.g. by means of one or more electrical contacts, or wirelessly, e.g. by means of tin optical or radio frequency (RF) connection. By way of example, the information makes it possible to program the operation of the device, e.g. the excitation level of the electrochromic multilayer structure and/or its variation, over time.

The device may have an antenna integrated therein, which antenna is capable of receiving electrical energy when it is subjected remotely to an excitation field and/or is capable of receiving information, e.g. relating to a mode of operation of the electrochromic multilayer structure. The antenna may be coiled, printed, or embedded in an electronic chip that is integrated in the device. Where appropriate, such a chip may include an embedded battery, optionally-rechargeable.

In the embodiment in FIG. 2, the energy source is superposed on the nail. In a variant not shown, the energy source is situated in front of the nail, e.g. on the underside of the device. This makes it possible to reduce the thickness of the structure in its portion that is superposed on the nail. This also makes it possible, where appropriate, to replace the energy source more easily, when said energy source is a miniature battery, e.g. of the button-battery type.

In the figures described below, the power-supply conductors and/or the integrated energy source are omitted for the purpose of clarity m the drawings.

The electrochromic multilayer structure may be excited with electrode layers that are each at a substantially constant potential, ignoring resistive losses. In particular, this is especially the case when the electrode layers are layers that extend over the entire extent of the stack.

In a variant, the electrochromic multilayer structure includes an electrode layer including at least two regions that are suitable for being powered selectively, e.g. at distinct potentials. By way of example, this optionally enables a pattern to appear depending on the region(s) that is/are powered. For example, one of the electrode layers includes two regions that extend in disjoint manner and that are connected respectively to two outlets of an electronic component enabling them to be powered selectively.

Regardless of the configuration of the electrosensitive stack, the electrochromic multilayer structure may be fastened to keratinous materials, e.g. the nails, in various ways, and preferably by means of a system that enables the device to be removed without risk of damaging said device.

The electrochromic device may include an adhesive that covers the bottom support layer, enabling the device to adhere when it is put into contact with the application zone, e.g. the nails or the lips.

FIGS. 2 and 3A show an adhesive layer 100, the adhesive preferably being hypoallergenic.

When a repositionable adhesive is used to fasten the electrochromic device to keratinous materials, the adhesive may include a block copolymer such as styrene block copolymers available from Kraton, or an acrylic polymer of molecular weight that is greater than 30000, better greater than 100000, preferably greater than 200000. The block copolymer or acrylic polymer may be present in the adhesive layer at a content by weight that is greater than 20%, preferably greater than 30%, thereby making it easier to obtain a cohesive adhesive layer that is capable of maintaining its integrity during unsticking.

The electrochromic device may include an adhesive layer that is cross-linkable on application, with the advantage of encouraging the adhesive layer to adhere to the application zone, in particular the nails or the lips. Before cross-linking, the adhesive layer may develop good wettability on the application zone. After cross-linking, the adhesive layer is harder and is more able to withstand shear.

When the electrochromic device includes a cross-linkable adhesive, the electrochromic device may be made available in a leaktight package, so as to ensure that cross-linking does not initiate before the device is used. Preferably, the cross-linkable adhesive includes a cyanoacrylate. The cross-linkable adhesive may include a mixture of ethyl cyanoacrylate, polymethyl methacrylate, and hydroquinone (adhesive available from "Francenails").

The electrochromic device may include an adhesive layer that includes at least 5%, preferably at least 10%, of at least one residual solvent. This characteristic has the advantage of encouraging the adhesive layer to adhere to the application zone, in particular the nails or the lips. Before complete drying, the presence of residual solvent promotes wettability of the adhesive layer on the application zone. After complete drying, the adhesive layer is harder and is more able to withstand shear.

The adhesive may include either a block copolymer such as styrene block copolymers available from Kraton, or an acrylic polymer, or a silicone adhesive of the BIO/PSA type. For example, the adhesive is an acrylic adhesive in solvent phase, e.g. like the adhesives from one Duro-Tak range available from National Adhesives, and including more than 10% residual solvent.

The adhesive is preferably present on the multilayer structure before said structure is put into place, but, in a variant, it may be applied to the nail, and then the multilayer structure is brought into contact therewith.

Figure 3B:
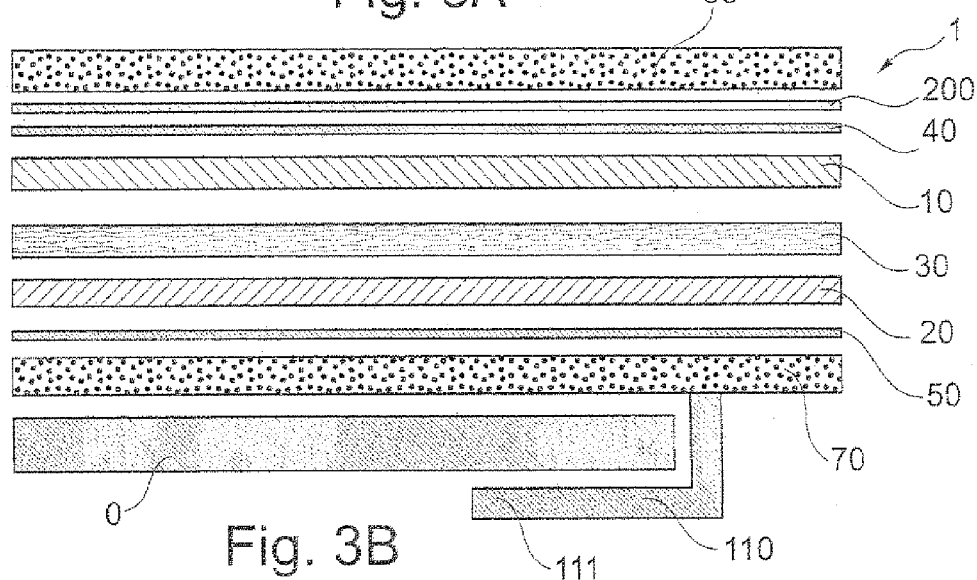

FIG. 3B shows a fastener system making use of mechanical fastening 110.

When a mechanical fastener system 110 is used, said system acts like a clamp, for example, coming to bear beneath the end of the nail, said nail thus being clamped between the support layer 70 and a tab 111 of the fastener system 110.

The electrochromic multilayer structure may also be fastened in some other way, e.g. by both adhesion and by clamping, by magnetisation, or by electrostatic adherence.

In the following figures, the fastener means used, e.g. an adhesive or a mechanical fastening at the end of the nail, for fastening the electrochromic device to the keratinous materials are no longer shown for the purpose of clarity in the drawings.

Figure 4:
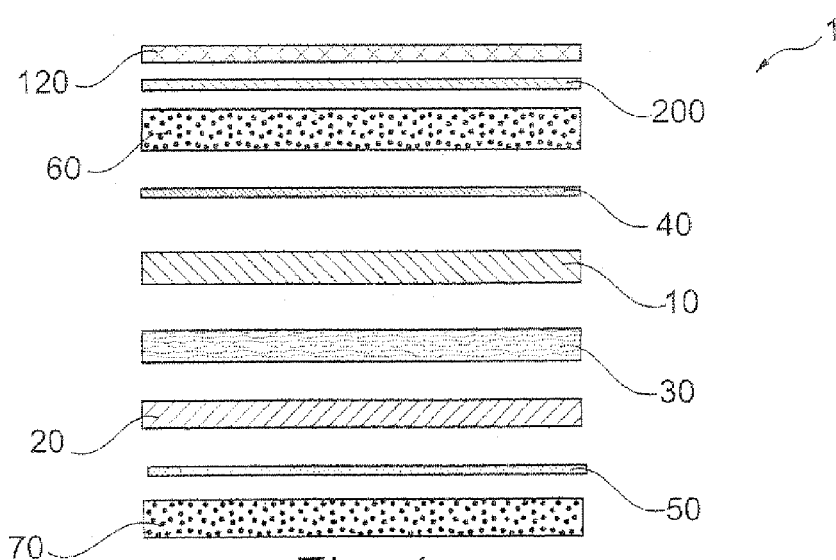
FIG. 4 shows the possibility of protecting the electrochromic multilayer structure with a protective layer.

As shown in FIG. 4, the outside of the electrochromic multilayer structure 1 may be coated in one or more outer protective layers 120 that may optionally be peelable.

At least one outer protective layer 120 may adhere by means of electrostatic forces or by using an adhesive. Where appropriate, the device 1 includes a plurality of peelable protective layers that are suitable for being removed successively as soon as defects (scratches, wear) are observed. The presence of a plurality of peelable layers at the surface of the device makes it possible to remove one of the layers at the surface, e.g. when a scratch is observed on the surface of the device. In addition, electrochromic devices are relatively costly technological items that need to be conserved in such a manner as to be able to use them several times, if possible. Preferably, the peelable layers comprise layers of alternating chemistries, so that the layers present one characteristic of not adhering to one another.

In other exemplary embodiments, a cross-linked, top coat coats the surface of the electrochromic device so as to make it longer lasting. Cross-linking may be achieved either by an epoxy and amine reaction, or with cyanoacrylates, or by exposing ethylene double bonds to ultraviolet (UV) radiation. Preferably, the thickness of the layer of top coat is less than 50 µm, preferably less than 20 µm, better less than 10 µm, so as to limit the impact of the top coat on the flexibility of the device.

Examples of cross-linked top coats are given in US publication No. 2008/0031836, which is incorporated herein by reference.

Various arrangements are described below that seek to obtain various optical effects, e.g. making it possible to create patterns or shading.

Figure 5A:
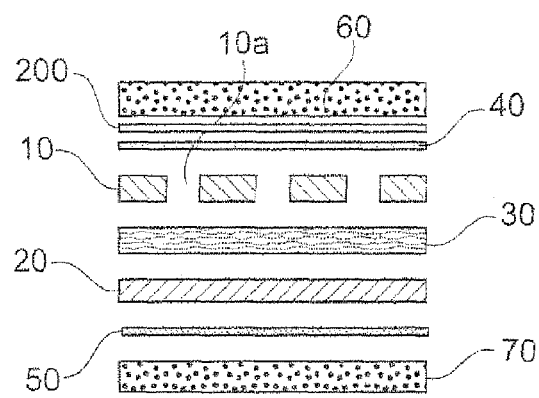
FIGS. 5A to 5L show different possible arrangements, amongst others, within an electrochromic multilayer structure.
Figure 5B:
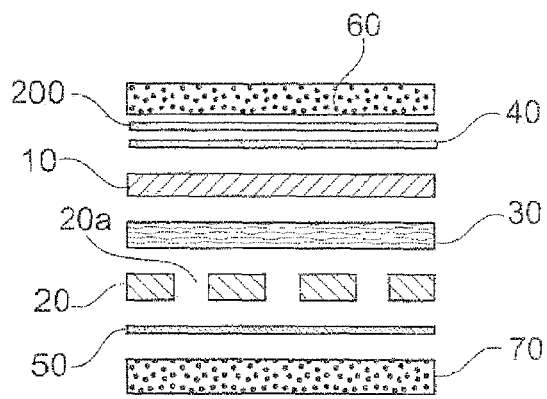

As shown in FIG. 5A or 5B, the first and/or second active electrochromic layers 10 or 20 may be made with thickness that is not uniform, e.g. thickness that varies in discontinuous manner, such that the appearance produced by the electrochromic structure depends on whether or not the material of the active electrochromic layer is present. For example, gaps 10a and/or 20a are made in the respective layers 10 and/or 20. The material of the layer 10 or 20 may be deposited in a pattern, by printing or transfer. In a variant, gaps 10a and/or 20a are made by using a material-removal technique, e.g.

laser machining, etching, or cutting out. A layer deposited in the form of a pattern, e.g. a heart, may be used. Such a layer may not be colored without electrical excitation and change color under electrical excitation, e.g. towards blue. It makes thereby possible for a heart-shaped pattern to appear violet if the colored background is red.

It can be seen in FIGS. 5A and 5B that the electrode layers 40 and 50 may be present respectively above and below the gaps 10a or 20a.

Figure 5C:
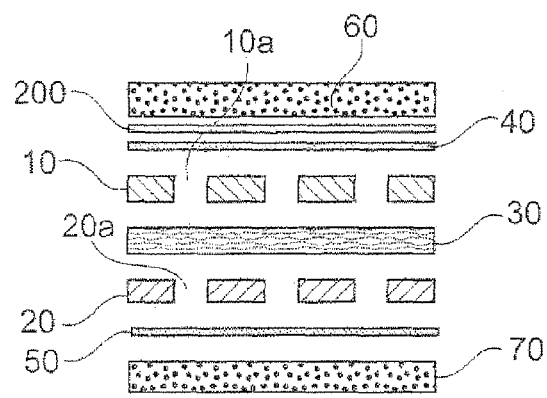

Alternatively, as shown in FIG. 5C, both the first and second active layers 10 and 20 may be made in discontinuous manner, e.g. with the gaps 10a and 20a of said active layers positioned directly on top of each other, for example.

Figure 7A:
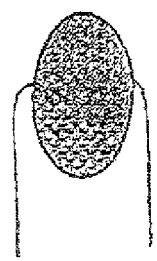
FIGS. 7A to 7J show various examples of effects that can be obtained.
Figure 7B:
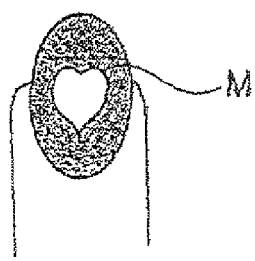

The presence of the gaps 10a and/or 20a makes it possible to form one or more patterns that are visible only under certain conditions of electrical excitation of the electrochromic structure. For example, in the absence of electrical excitation of the electrochromic structure, the nail appears uniform in color, as shown in FIG. 7A. The uniform color may be the color of the nail, for example, or it may result from the intrinsic color of one of the layers of the structure. As described below, it may alternatively result from the presence of an optically-active layer within the electrosensitive stack or beneath said stack, e.g. as colored background. In the presence of electrical excitation, a pattern M may appear on the nail, e.g. a heart-shaped pattern, as shown in FIG. 7B, as a result of the change in appearance of the electrosensitive stack.

Figure 5D:
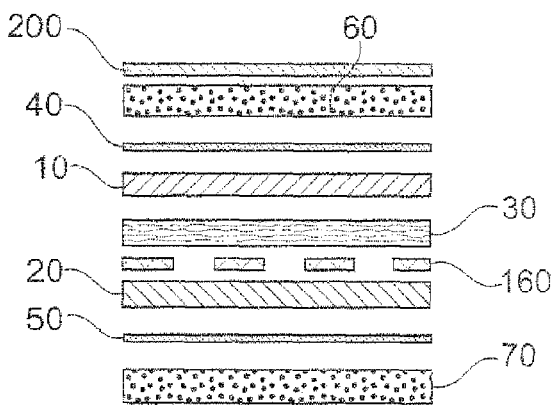
Figure 5E:
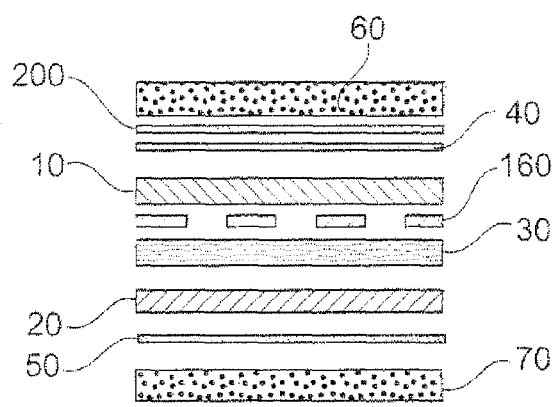

Regardless of whether or not the electrode layer, the active electrochromic layer, and/or the electrolyte layer are uniform, in particular are of constant thickness, and/or are of homogeneous composition, it is possible to interpose a shield 160 between one of the active electrochromic layers 10 or 20 and the electrolyte layer 30, e.g. a shield of electrical insulation, making it possible locally to distance the electrolyte layer from an adjacent active electrochromic layer, as shown in FIG. 5D or 5E, or to change in some other way the interaction between the layers that are situated on either side of the shield 160 and that are in contact therewith. The shape given to the shield 160 depends on the shape of the pattern that it is desired to produce. By way of example, the shield 160 is deposited by printing or transfer with the desired pattern. Alternatively, the shield 160 may be machined, cut out, or etched to form the desired pattern(s). The shield 160 may be optionally colored, optionally reflective, may be composed of PMMA, or made of PET. By way of example, the thickness of the shield 160 lies in the range 1 µm to 100 µm, preferably in the range 5 µm to 30 µm.

At least one of the layers of the stack of the multilayer structure may have properties that are not uniform as a result of using, within the layer, materials having different electrical and/or optical properties.

Figure 5F:
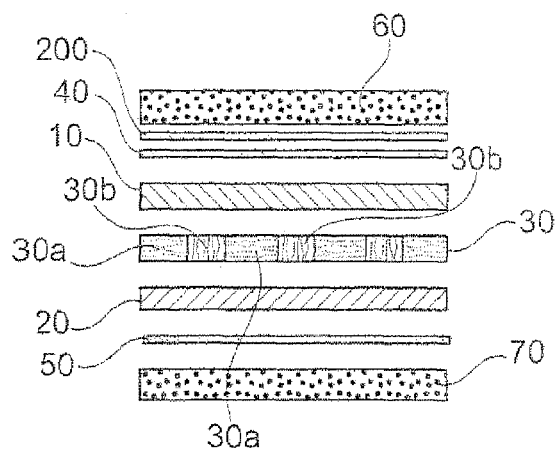

As shown in FIG. 5F, different materials may be used for the electrolyte layer 30, which materials are situated in respective regions, which regions may optionally be disjoint.

For example, the electrolyte layer 30 may comprise one or more first regions 30a that comprise a first electrolyte, and one or more second regions 30b that comprise a second electrolyte that is different from the first. By way of example, the regions 30a and 30b are deposited by printing, or one of the regions is formed by treating, in selective manner, the material of the other region, so as to transform the material and change its properties.

One of the regions 30a and 30b may be of shape that corresponds to the shape of the pattern to be made. One of the regions 30a or 30b may be inert from an electrochemical point of view, and may be used merely to compensate for the thickness of the other region(s) acting as an electrolyte layer.

Figure 5G:
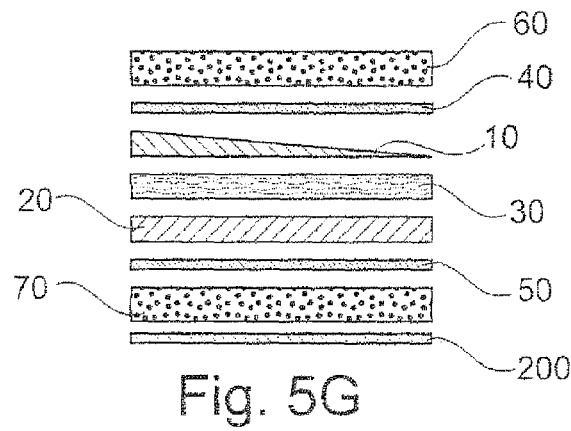
Figure 5H:
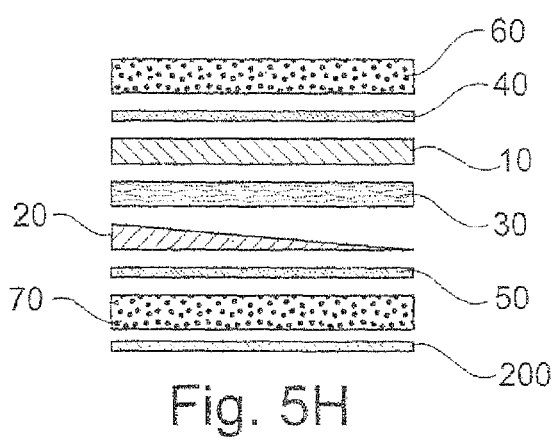
Figure 5I:
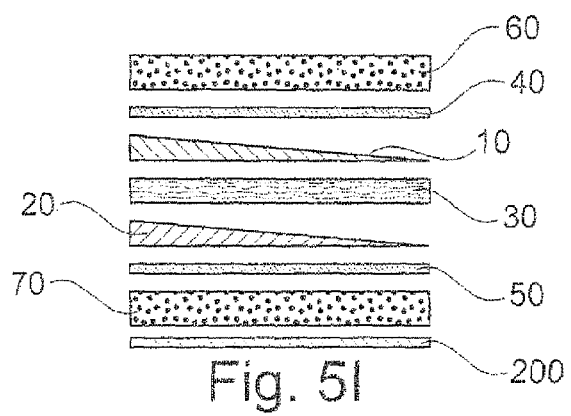

At least one of the active electrochromic layers 10 or 20 may be made with thickness that is not constant, but not zero, as shown in FIGS. 5G, 5H, and 5I.

Figure 5J:
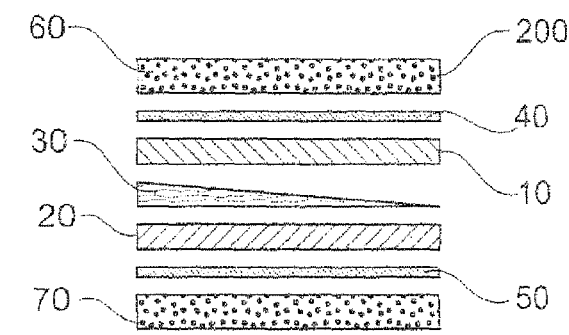
Figure 5K:
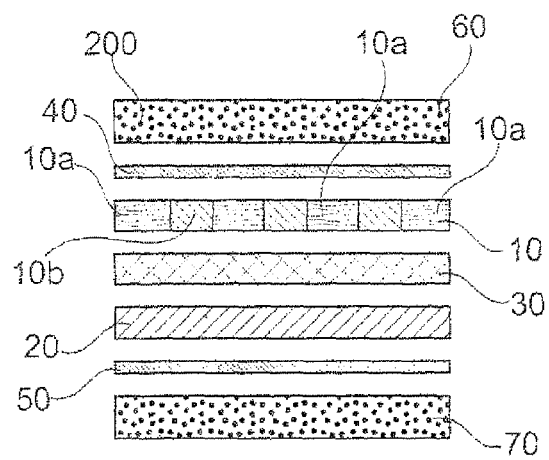

The electrolyte layer 30 may also be made with a variation in thickness, as in FIG. 5J.

By way of example, the thickness may vary in progressive manner so as to produce shading, with said thickness reducing, optionally in constant manner. The variation may occur in one of the directions of a plane, or, in a variant, in both directions. In order to obtain a variation in a first direction X of a plane, it is possible, for example, to use a spreader that moves in a second direction Y that is perpendicular to the first and of slope in the first direction that gives the variation in the thickness in that direction. Along at least one direction of the plane, the thickness may also pass via an extremum that may be a maximum or a minimum.

In order to compensate for the variation in thickness of one of the layers of the stack, at least one other layer of the structure may present thickness that varies in the opposite direction. The other layer may be an adjacent layer. The other layer may optionally be electrically active, and may optionally be optically active.

Figure 5L:
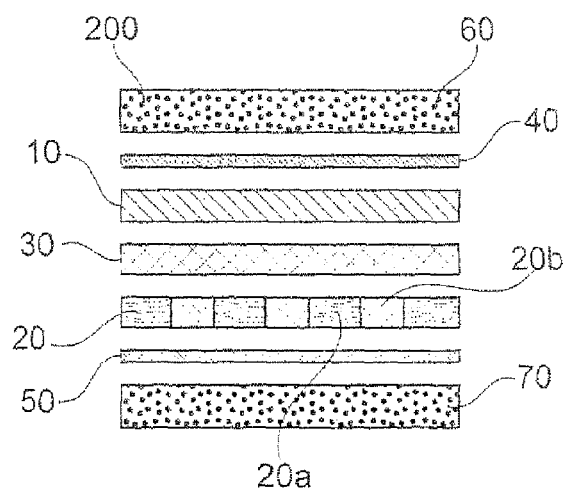

In order to create an optical effect with the active electrochromic layer (s) 10 and/or 20, a plurality of materials presenting different conductivities and/or different electrochromic properties may be used, as shown in FIGS. 5L and 5E.

FIG. 5L shows the possibility of making the layer 20 with regions 20a and 20b formed by different material. The same applies for the layer 10 in FIG. 5K, formed of regions 10a and 10b made out of different materials. The different materials may be active electrochromic agents, but, in a variant, only one of the materials has this role, the other possibly being inert from an electrochromic point of view. The materials of the regions 20a and 20b may optionally be in contact.

The regions made with the material that is inert from an electrochromic point of view may be used to compensate for the thickness of the other active electrochromic regions.

For a polymer mixture, e.g. in one of the active electrochromic layers, two polymers may be used, being juxtaposed or mixed, in homogeneous manner or without the mixture leading to a homogeneous whole, thereby making it possible to create other colors and/or to form one or more patterns that are visible only while the device is being activated, for example.

When a plurality of polymers are juxtaposed, polymers having different electrical conductivities may be used, thereby generating contrasts between the various regions.

The layer of electrochromic conductive polymer may, for example, include a material selected from: polyaniline; polythiophene; and polypyrrole and a dopant. Preferably, the layer of electrochromic conductive polymer includes a material selected from: polydiphenylamine; poly(4-amino biphenyl); poly(3-alkyl (Ci to C8) thiophenes); poly(diphenyl benzidine); polyphenylene; poly(phenylene vinylene); a poly(allylene vinylene); a poly(aminoquinoline); poly(3,4-ethylenedioxythiophene) and derivatives thereof; or derivatives or copolymers thereof; and a dopant.

All of the structure examples shown in FIGS. 5A to 5L may be combined within variants that are not shown.

Figure 6A:
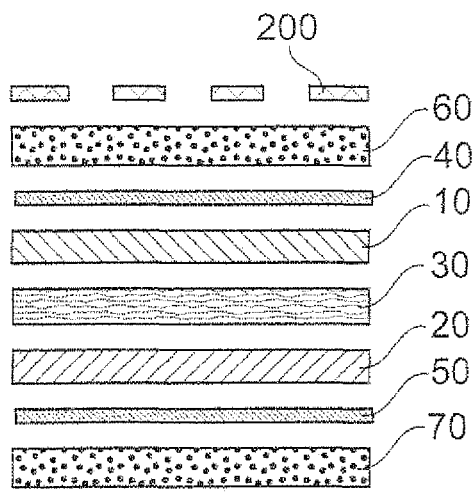
FIGS. 6A to 6E show other examples of electrochromic multilayer structures.
Figure 6B:
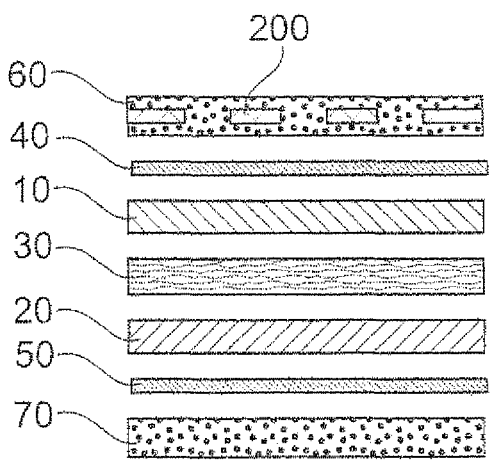
Figure 6C:
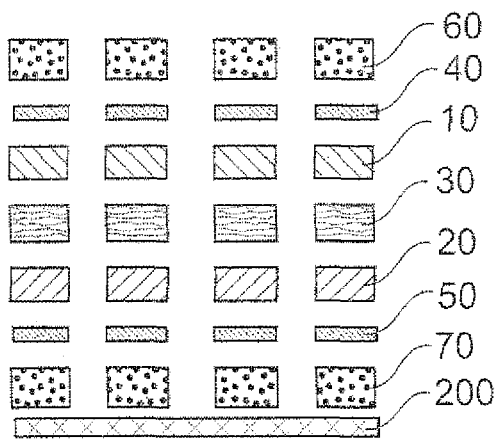
Figure 6D:
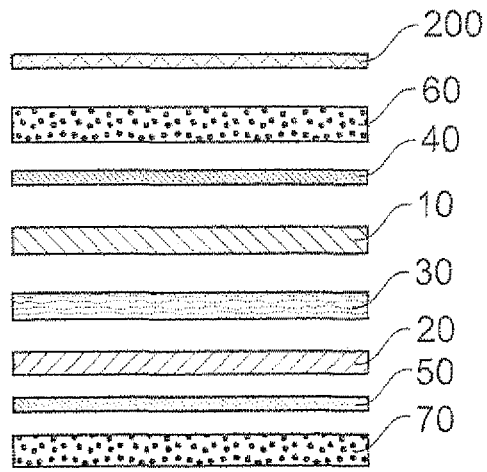
Figure 6E:
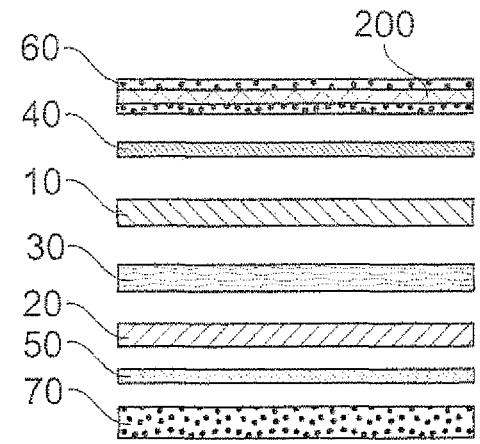

The optically-active, non-electrochromic layer 200 may act as a mask and/or a filter against incident and/or reflected light, as shown in FIGS. 6A and 6B, or as a background, in particular a colored background, as shown in FIG. 6C. The layer 200 may be continuous, as shown in FIGS. 6D and 6E, or discontinuous, as shown in FIGS. 6A and 6B. In particular, the layer 200 may form a pattern.

As shown in FIG. 5J, the optically-active layer 200 may coincide with a support layer, e.g. the support layer 60.

The electrochromic device may include at least one optically-active layer including an interference pigment e.g. a nacre or a goniochromatic pigment, disposed in an optionally-uniform layer, e.g. in a pattern. Illustrative examples of nacres suitable for being introduced as interference pigment and that may be mentioned are gold color nacres, in particular those sold by ENGELHARD under the trade names Brillant gold 212G (Timica), Gold 222C (Cloisonne), Sparkle gold (Timica), Gold 4504 (Chromalite), and Monarch gold 233X (Cloisonne); bronze nacres, in particular those sold by MERCK under the trade names Bronze fine (17384) (Colorona) and Bronze (17353) (Colorona), and by ENGELHARD under the trade name Super bronze (Cloisonne); orange nacres especially those sold by ENGELHARD under the trade names Orange 363C (Cloisonne) and Orange MCR 101 (Cosmica), and by MERCK under the trade names Passion orange (Colorona) and Matte orange (17449) (Microna); brown-tinted nacres sold by ENGELHARD under the trade names Nu-antique copper 340XB (Cloisonne) and Brown CL4509 (Chromalite); nacres with a copper glint sold by ENGELHARD under the trade name Copper 340A (Timica); nacres with a red glint, especially those sold by MERCK under the trade name Sienna fine (17386) (Colorona); nacres with a yellow glint, especially those sold by ENGELHARD under the trade name Yellow (4502) (Chromalite); red-tinted nacres with gold glints, especially those sold by ENGELHARD under the trade name Sunstone G012 (Gemtone); pink nacres, especially those sold by ENGELHARD under the trade name Tan opale G005 (Gemtone); black nacres with a glint, especially those sold by ENGELHARD under the trade name Nu antique bronze 240 AB (Timica); blue nacres, especially those sold by MERCK under the trade name Matte blue (17433) (Microna) ; white nacres with silvery glints, especially those sold by MERCK under the trade name Xirona Silver; and orange-pink green-gold highlight nacres sold by MERCK under the trade names Indian summer (Xirona); and mixtures thereof.

The electrochromic device may be arranged in such a manner that, on changing color while being electrically excited, it filters at least one wavelength, and thus changes the color resulting from superposing the optically-active layer including the interference pigment and at least one layer of the electrosensitive stack.

By way of example, the electrochromic device may be used to suppress one or more color components of at least one interference pigment, thereby presenting a change in color as a function of the angle of observation and/or of the curvature of the support.

In this circumstance, the electrically-excitable stack of the electrochromic device may present a color that filters one of the components of the color path of an underlying goniochromatic interference pigment.

For example, for a red/gold path, the electrochromic device may be arranged to present a blue color that absorbs the gold color. In this way, while the electrochromic device is being activated, only the red color is seen, and when the electrosensitive stack becomes transparent, then the effect changes and the color that is seen follows a red/gold path.

The electrochromic device may also include a layer containing at least one diffractive pigment. In particular, the diffractive pigment used may be selected from those described in US patent application No. 2003/0031870 published on Feb. 13, 2003.

A diffractive pigment may, for example, have the following structure; $MgF_2/Al/MgF_2$, a diffractive pigment having this structure being sold by FLEX PRODUCTS under the trade names SPECTRAFLAIR 1400 Pigment Silver or SPECTRAFLAIR 1400 Pigment Silver FG. The proportion by weight of $MgF_2$ may lie in the range 80% to 95% of the total weight of the pigment.

Other diffractive pigments are sold by ECKART® under the trade names Metalure® Prismatic.

The electrosensitive stack may be used on demand to filter at least one wavelength of the light reflected by the underlying diffractive pigment. The diffractive pigment may present a goniochromatic effect, in particular a rainbow effect, that may be complete while the electrochromic device is not being activated, and may be limited to a fraction of the visible spectrum while the electrochromic device is being activated, by filtering one or more wavelengths reflected by the diffractive pigment. In this way, an effect that it is impossible to obtain in the prior art by a simple combination of interference pigments is obtained.

The electrochromic device may include at least one luminescent compound, which is sensitive to at least one wavelength that causes it to luminesce.

The electrosensitive stack of the electrochromic device may be used to filter the excitation wavelength(s) of the underlying luminescent compound that is a fluorescent or phosphorescent compound, for example. Thus, the electrochromic device may optionally be used to enable the luminescent compound to be illuminated. For example, the electrochromic device may be used to filter infrared or ultraviolet, and the luminescent compound may be fluorescent in infrared or ultraviolet. By inhibiting the fluorescence to a greater or lesser extent depending on the excitation state of the electrosensitive stack, it is possible to change the appearance of the luminescent compound, The device may include a fluorescent compound having a color, e.g. a red color, that is intensified by light excitation. The electrosensitive stack may be used to filter, in optionally-local manner, the light activating the fluorescent compound. Locally inhibiting fluorescence could lead to a difference in appearance between the zones of the compound in which the fluorescence is inhibited and the zones in which it is not inhibited. By way of example, it is possible to obtain intensely colored zones juxtaposed with paler colored zones, e.g. zones of an intense red in alternation with zones of a paler red.

The luminescent compound may be selected from suitable commercially-available photoluminescent agents, and, amongst others, mention may be made of the photoluminescent agent Luminux® sold by HONEYWELL, in particular Luminux® Effect Blue A, Luminux® Effect Green A, and Luminux® Effect Red A, or the photoluminescent agent Netoje® containing a high proportion of rare earths and sold by NEC/TOKIN. In another implementation of the invention, at least one photoluminescent agent may include a semiconductor, in particular in the form of particles, e.g. of Si, ZnO, CdSe, .... In another implementation of the invention, at least one photoluminescent agent may include particles of average size lying in the range about 1 nm to about 10 nm, present in the form of crystals, e.g. of CdSE, CdSe/ZnS, or CdTe/CdS. Powder particles of PMMA, polyethylene (PE), polystyrene (PS), or polycarbonate (PC) encapsulating nanoparticles of CdSe are sold by EVIDENT TECHNOLOGIES under the trade name EVI COMPOSITE™. The electrochromic device may include at least one metal pigment, in particular a pigment that makes it possible to create highlight points on the made-up zone. The color of the metal particles may be modulated by the electrosensitive stack when said stack varies from transparent to colored or from one color to another as a function of the electrical excitation thereof. The metal particles may be reflective, being silvery, golden, or coppery, and, by way of example, they may be situated In an optically-active layer within the electrosensitive stack, on said electrosensitive stack, or beneath said electrosensitive stack.

The metal particles may be selected from reflective particles comprising an inorganic substrate coated with a metal layer; mention may also be made of particles comprising a substrate of borosilicate coated with silver. Glass substrate particles coated with silver in the form of flakes are sold under the trade name MICRO-GLASS METASHINE REFSX 2025 PS by TOYAL. Glass substrate particles coated with an alloy of nickel, chromium, and molybdenum are sold under the trade name CRYSTAL STAR GF 550, GF 2525 by the same company.

Reflective particles having a metallic glint and of any-shape, may also be selected from particles of synthetic substrate at least partially coated with at least one layer of at least one metal oxide selected, for example, from oxides of titanium, in particular $TiO_2$, of iron, in particular $Fe_2O_3$, of tin, or of chromium, barium sulfate, and the following materials; $MgF_2$; $CrF_3$; $ZnS$; $ZnSe$; $SiO_2$; $Al_2O_3$; $MgO$; $Y_2O_3$; $SeO_3$; $SiO$; $HfO_2$; $ZrO_2$; $CeO_2$; $Nb_2O_5$; $Ta_2O_5$; $MoS_2$; and mixtures thereof.

Examples of reflective particles that may be mentioned are particles comprising a substrate of synthetic mica coated with titanium dioxide, or glass particles coated either with brown iron oxide, titanium oxide, tin oxide, or one of their mixtures such as those sold under the trade name REFLECKS® by ENGELHARD.

Other examples of reflective particles having a metallic glint and presenting a metal compound on their surface or including at least one coated metal compound that may be mentioned are particles proposed under the trade names: METASHINE® ME 2040 PS, METASHINE® MC5090 PS, or METASHINE® MC280GP (2523) by NIPPON SHEET GLASS; SPHERICAL SILVER POWDER® DC 100, SILVER FLAKE® JV 6, or GOLD POWDER® A1570 by ENGELHARD; STARLIGHT REFLECTIONS FXM® by ENERGY STRATEGY ASSOCIATES INC; BRIGHT SILVER® 1 E 0.008×0.008 by MEADOWBROOK INVENTIONS; ULTRAMIN® (FINE LIVING ALUMINUM POWDER); and COSMETIC METALLIC POWDER VISIONNAIRE BRIGHT SILVER SEA®, COSMETIC METALLIC POWDER VISIONNAIRE NATURAL GOLD® (60314), or COSMETIC METALLIC POWDER VISIONNAIRE HONEY® (60316) by ECKART. The electrochromic device may be made in such a manner as to vary the visible contrast between at least a colored first region and a surrounding second region having a color that is a function of the activation state of the electrochromic device, for example. Thus, by changing the color of the second region surrounding the first region, it is possible to increase or to decrease the color contrast between them, and, by way of example, to make the marked pattern visible to a greater or lesser extent, as shown in FIGS. 7C and 7D.

Figure 7C:
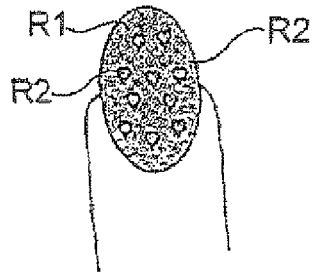

FIG. 7C shows at least a first region $R_1$ having a color that is predefined, and at least a second region $R_2$ adjacent to the first region $R_1$ and having a color that changes depending on the activation state of the electrochromic device. Thus, the color of the region $R_2$ may pass from a color in which the region $R_1$ is clearly visible, as in FIG. 7C, to a state In which the color of the region $R_2$ is close to the color of the region $R_1$, and in which the region R1 is difficult to distinguish due to a lack of contrast.

Figure 7D:
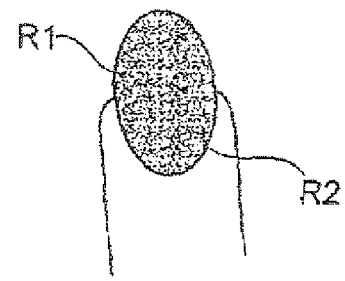

By way of example, and for FIGS. 7C and 7D, the region $R_2$ corresponds to a background of uniform color beneath the electrosensitive stack.

In a variant, the region $R_2$ is defined as a surface layer.

Still in a variant, the region $R_2$ is defined by a layer that is present within the electrosensitive stack.

The electrochromic device may Include at least one "Xchrome" coloring agent that is sensitive to external stimulus, e.g. a photochromic, solvatochromic, or tribochromic agent. In this circumstance, a region including such a coloring agent may be of appearance that changes as a function of the environment of the made-up zone, but also of the state of the electrochromic device that may be used to filter a color of the Xchrome pigment and/or as a color environment of the coloring agent.

When at least one photochromic agent is used, the electrochromic device may be used for optionally-enabling the photochromic agent to be excited by the surrounding light. For example, if the photochromic agent changes in appearance on exposure to light of wavelength 500 nm, in particular it changes color, the electrosensitive stack may be arranged so as to filter at least one excitation wavelength of the photochromic agent. Thus, depending on the excitation state of the electrochromic device, the photochromic agent may or may not react to the surrounding light.

FIGS. 7E to 7H show various effects that may possibly be obtained.

Figure 7E:
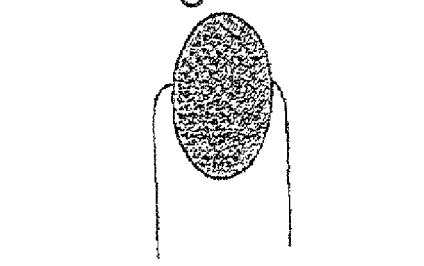
Figure 7F:
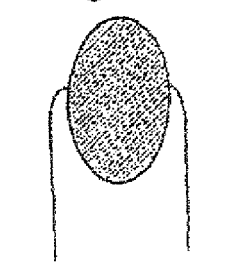
Figure 7G:
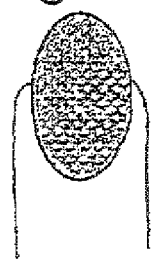
Figure 7H:
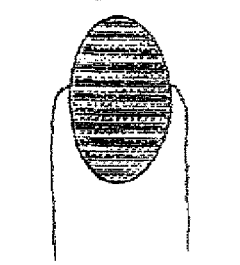

FIG. 7E shows the appearance of made-up zones without electrical excitation, and FIG. 7F with electrical excitation. FIG. 7G shows the appearance of the made-up zone without light activation but with electrical excitation, and FIG. 7H with light excitation and with electrical activation.

In other exemplary embodiments of the invention, the electrochromic device may be used to improve the visibility of a pearlescent or an interference effect.

For example, as a function of a color of the electrosensitive stack of the electrochromic device and of the color of the interference pigment(s), it is possible to amplify the intensity of the color that is seen. For example, if the electrochromic device contains at least one nacre, e.g. in one of the layers of the stack or even at its surface, e.g. a red-colored nacre, and if the electrochromic device makes it possible to change the color of the electrosensitive stack from blue to green, the intensity of the color of the nacre is seen to be more intense with the green-colored electrosensitive stack.

When the electrosensitive stack of the electrochromic device is made so as to take a color that is close to the color of a zone that is present at its surface or within the stack, the visibility of the zone may be decreased. If said zone presents a goniochromatic effect depending on a color path, and if the electrochromic device is capable of presenting, by activation, one of the colors included in the color path, it becomes optionally possible to mask the presence of the zone as a function of the angle of observation, of lighting, and/or of the curvature of the device. For example, the color path of a goniochromatic pigment may be revealed on demand to a greater or lesser extent, e.g. for optionally increasing a volume effect.

The electrochromic device may be used to reinforce, in selective manner, the color effect of a pearlescent pigment, e.g. a nacre. As a function of the color of the electrochromic device, it is optionally possible to amplify the intensity of highlight points produced with such a nacre.

The electrosensitive stack may be used to absorb or to reflect the light transmitted by an optically-active layer deposited on the surface of the electrochromic device, the layer containing an interference pigment, e.g. a nacre giving an iridescent effect, or a liquid crystal. Illustrative examples of nacres suitable for being introduced into the composition as interference pigment and that may be mentioned are gold color nacres, in particular those sold by ENGELHARD under the trade names Brillant gold 212G (Timica), Gold 222C (Cloisonne), Sparkle gold (Timica), Gold 4504 (Chromalite), and Monarch gold 233X (Cloisonne); bronze nacres, in particular those sold by MERCK under the trade names Bronze fine (17384) (Colorona) and Bronze (17353) (Colorona), and by ENGELHARD under the trade name Super bronze (Cloisonne); orange nacres especially those sold by ENGELHARD under the trade names Orange 363C (Cloisonne) and Orange MCR 101 (Cosmica), and by MERCK under the trade names Passion orange (Colorona) and Matte orange (17449) (Microna); brown-tinted nacres sold by ENGELHARD under the trade names Nu-antique copper 340XB (Cloisonne) and Brown CL4509 (Chromalite); nacres with a copper glint sold by ENGELHARD under the trade name Copper 340A (Timica); nacres with a red glint, especially those sold by MERCK under the trade name Sienna fine (17386) (Colorona); nacres with a yellow glint, especially those sold by ENGELHARD under the trade name Yellow (4502) (Chromalite); red-tinted nacres with gold glints, especially those sold by ENGELHARD under the trade name Sunstone G012 (Gemtone); pink nacres, especially those sold by ENGELHARD under the trade name Tan opale G005 (Gemtone); black nacres with a glint, especially those sold by ENGELHARD under the trade name Nu antique bronze 240 AB (Timica); blue nacres, especially those sold by MERCK under the trade name Matte blue (17433) (Microna); white nacres with silvery glints, especially those sold by MERCK under the trade name Xirona Silver; and orange-pink greengold highlight nacres sold by MERCK under the trade names Indian summer (Xirona); and mixtures thereof. By way of example, interference pigments presenting magnetic properties are those sold under the trade names COLORONA BLACKSTAR BLUE, COLORONA BLACKSTAR GREEN, COLORONA BLACKSTAR GOLD, COLORONA BLACKSTAR RED, CLOISONNE NU ANTIQUE SUPER GREEN, MICRONA MATTE BLACK (17437), MICA BLACK (17260), COLORONA PATINA SILVER (17289), and COLORONA PATINA GOLD (117288) by MERCK, or indeed FLAMENCO TWILIGHT RED, FLAMENCO 25TWILIGHT GREEN, FLAMENCO TWILIGHT GOLD, FLAMENCO TWILIGHT BLUE, TIMICA NU ANTIQUE SILVER 110 AB, TIMICA NU ANTIQUE GOLD 212 GB, TIMICA NU-ANTIQUE COPPER 340 AB, TIMICA NU ANTIQUE BRONZE 240 AB, CLOISONNE NU ANTIQUE GREEN 828 CB, CLOISONNE NU ANTIQUE BLUE 626 CB, GEMTONE MOONSTONE G 004, CLOISONNE NU ANTIQUE RED 424 CHROMA-LITE, BLACK (4498), CLOISONNE NU ANTIQUE ROUGE FLAMBE (code 440 XB), CLOISONNE NU ANTIQUE BRONZE (240 XB), CLOISONNE NU ANTIQUE GOLD (222 CB), and CLOISONNE NU ANTIQUE COPPER (340 XB) by ENGELHARD.

By way of example, the electrosensitive stack may present cameo (pale/dark) variation as a function of the electrical excitation. Thus, when the electrosensitive stack produces a pale color, the interference pigment that is situated above the electrosensitive stack is barely visible. On the other hand, when the electrosensitive stack or the liquid crystal is dark, the interference pigment or the liquid crystal becomes clearly visible.

Figure 7I:
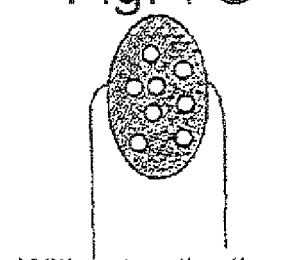
Figure 7J:
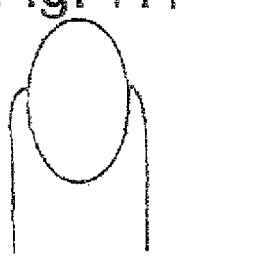

FIGS. 7I and 7J show the appearance when an interference pigment is visible to a greater or lesser extent depending on the color of the background. FIG. 7I shows a dark background color, e.g. when the electrochromic device is not activated, and FIG. 7J shows a pale background color, e.g. when the electrochromic device is activated.

FIG. 8 shows a device 300 that is suitable for electrically powering an example of an electrochromic device 1 of the invention, when said device does not include an integrated energy source, or when said source needs to be charged and/or the device needs to be programmed.

The device 300 may include a housing 301 for receiving at least one finger, the housing 301 possibly being provided with electrical contacts 302 and 303, e.g. for electrically powering the electrochromic device.

The electrical contacts 302 and 303 may be fastened or mounted on springs, so as to adapt more easily to the finger.

In a variant not shown, the device 300 includes an RF device making it possible to transmit, by induction, energy and/or information to an antenna that is integrated in the electrochromic device.

In order to use the device 300 in FIG. 8, the user may engage a finger in the housing 301, as shown in FIGS. 9A and 9B, and bring the electrical contacts of the electrochromic device, e.g. formed by the electrical conductors 81 and 82 shown in FIGS. 1A and 1B, to bear against the power-supply terminals 303 and 302.

A power-supply device such as the device 300, for example, may be put on sale together with the electrochromic devices within a single package.

The sale of articles presenting a change in result following a stimulus, as occurs with an electrochromic device made in accordance with the invention, may present the drawback that during the act of purchasing the consumer cannot visualize the result, which may lead to reluctance to purchase. In order to remedy this, a display unit may be present at the point of sale, with at least one tester enabling the consumer to apply the electrical stimulation and thus observe the change in color. The display unit may include various electrical excitation means.

FIG. 10 shows an example of a display unit 400 that is suitable for being used to present one or more electrochromic multilayer structures of the invention to consumers.

The display unit may include means that make it possible to power one or more electrochromic structures selectively, so as to enable an observer to see the change that is induced by a change in the electrical excitation of at least one of the electrochromic structures. By way of example, the power-supply means are in the form of a stylus 410, or other handpiece, that the user may use for electrically powering the chosen multilayer electrochromic structure.

Where appropriate, the display unit may include a plurality of power-supply means 410, so as to enable it to be used by a plurality of people simultaneously. The electrochromic structures present on the display unit may be associated with identifiers enabling the consumer subsequently to obtain a package containing the corresponding electrochromic structures.

The display unit may also include an electrochromic multilayer structure that is excited automatically or when an observer acts on a control member, in order to observe the effect of the change in appearance. The electrochromic multilayer structure may be a structure that is identical to the structures put on sale, or it may be a bigger structure that can be seen more easily from afar.

Where appropriate, an entire range of electrochromic multilayer structures may be made available to the user, as shown in FIG. 13, e.g. of different sizes, in order to be able to fit them to different fingers.

A help system for helping to select sizes may be made available to users. The selection help system may be included in a panel presenting drawings, diagrams, or photographs of fingers. It thus suffices to place a finger on the panel, and to identify the finger or nail in the drawing, diagram, or photograph that corresponds to the user's own finger or nail. A reference corresponding to the selected size of finger or nail makes it possible to select an electrochromic device of the most appropriate size. Preferably, at least eight or ten different electrochromic nail sizes are made available to users.

The electrochromic devices may be in the form of false nails that may be made available to users in packets of 10 electrochromic false nails (for each hand), with, for example, amongst the false nails, two nails of width lying in the range 1.1 cm to 1.3 cm, preferably two nails of width 1.2 cm (for the thumbs), two nails of width lying in the range 0.6 cm to 0.8 cm, preferably two nails of width 0.7 cm (for the little finger's), and six nails of width lying in the range 08 cm to 1.0 cm, preferably six nails of width 0.9 cm (for the other fingers).

The false nails may also be made available to users singly.

The electrochromic device(s) may be sold in at least one package that is transparent at least in part, making it possible to see a change in appearance of the electrochromic device associated, with a change in the excitation of said device. The electrical contacts of the electrochromic device(s) may be connected to a battery that is contained in the package with an electrical circuit that includes a switch that is accessible by the user without opening the package. The switch makes it possible to cause electric current to pass, e.g. under the effect of pressure exerted by the user at a predefined location on the package.

Powering the electrochromic multilayer structure so as to charge an integrated energy source or so as to excite the electrosensitive stack in order to change its appearance, at least temporarily, is performed by means of a power-supply device, as shown in FIGS. 11 and 12. By way of example, the device includes a handpiece that is handled by the user, the end of said handpiece being provided with two electrical terminals 420 and 421 for electrically contacting two corresponding contacts of the electrochromic multilayer structure, e.g. situated at the distal end thereof or on a bottom face thereof.

Where appropriate, the device 415 may house an electrical energy source 423. The device 415 may include an activation button 424 and a switch 425, making it possible optionally to connect at least one of the terminals 420 or 421 to the energy source 423.

Thus, the user may use the device 415 by bringing it into contact with the electrochromic multilayer structure to be excited, and then press the activation button 424 for accurately controlling the duration during which voltage is applied. When the change in appearance is progressive, the user may stop applying voltage when the desired appearance is achieved.

The invention is not limited to an electrochromic device for applying to a nail, and, by way of example, the electrochromic device may be applied to the lips or to the skin, e.g. by using a hypoallergenic adhesive.

The characteristics of the various embodiments shown may be combined within variants that are not shown.

For example, the configurations of electrical conductors shown in FIGS. 1A and 1B can be used for the electrochromic multilayer structures shown in FIGS. 3A *to* 6E, amongst others. The same applies for the configuration shown in FIG. 2, and for the fastener means for fastening to the keratinous materials and described with reference to FIGS. 3A and 3B. The peelable protective film shown in FIG. 4 may be added to any of the stacks described in FIGS. 5A to 5I and 6A to 6E, amongst other embodiments.

The patterns produced with the electrochromic multilayer structure may be various, in particular they may correspond to any alphanumeric character and/or shading, in particular any design incorporating shading. The pattern may possibly be personalized, with the person who is to receive the device providing an image of a chosen pattern, and with the electrochromic multilayer structure being made accordingly.

The invention is not limited to electrochromic multilayer structures in which the electrode layers and the active electrochromic layers are distinct, and these layers may coincide, where appropriate, as shown in publication WO 2005/015301.

The pattern(s) may be visible only while the electrochromic device is being excited, or, in a variant, they may cease to be visible only while the electrochromic device is being excited, depending on the materials used.

The active electrochromic layers may include one or more polymers selected, for example, from the following list and used alone, in a mixture, or in juxtaposed manner:

poly(3-methylthiophene):

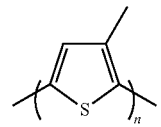

poly(3,3-dimethyl-3,4-dihydro-2H-thieno-[3,4-b]dioxepine:

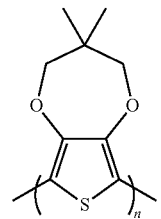

poly(3,4-ethylenedioxypyrrole) (a) and poly(3,4-propylenedioxypyrrole) (Pprodop) (b) [representative of (poly (3,4-alkylenedioxypyrrole) PXDOTs derivatives]:

(a)

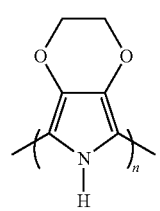

(b)

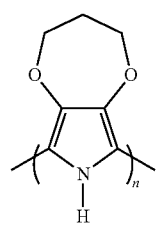

poly(N-sulfonatopropoxy-ProDOP):

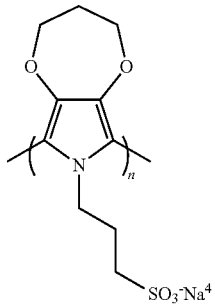

poly(bis-ethylenedioxythiophene-N-methylcarbazole):

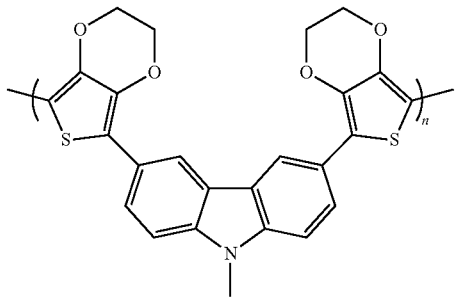

poly(bis-ethylenedioxythiophene-pyridine):

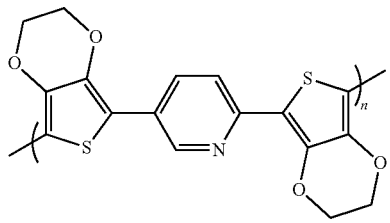

poly(bis-ethylenedioxythiophene-pyridopyrazine):

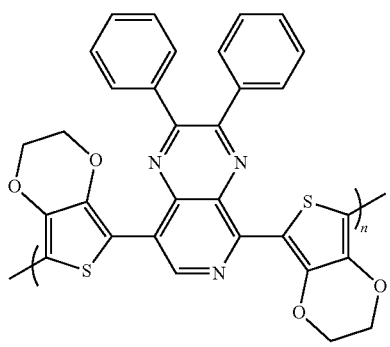

poly-(benzo[c]thiophene-N-2-ethylhexy-4,5-dicarboxylic imide):

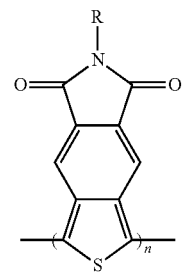

poly(2,2'-[10-methyl-3,7-phenothiazylene]-6,6'-bis[4-phenylquinoline]):

In the invention, the layer of electrochromic conductive polymer may, for example, include a material selected from-, polyaniline; polythiophene; and polypyrrole; and a dopant. Preferably, the layer of electrochromic conductive polymer includes a material selected from: polydiphenylamine; poly(4-amino biphenyl); poly(3-alkyl (Ci to C8) thiophenes); poly(diphenyl benzidine); polyphenylene, poly(phenylene vinylene); a poly(allylene vinylene); a poly(aminoquinoline); poly(3,4-ethylenedioxythiophene); and derivatives thereof; or derivatives or copolymers thereof; and a dopant.

The electrolyte layer is preferably chosen among mixtures of a polymer with a dissolved salt. The polymer is chosen, for example, in the following list: polyethylene glycols, polypropylene glycols, ethylene polyoxides, oxyethylene and epichloridrine copolymers, propylene polyoxides, polyalkyl-methacrylates, and polyalkyle-acrylates. The salt may be sodium chloride, lithium chloride, lithium perchlorate, lithium trifluoromethylsulfonate, lithium hexafluorophosphate, or lithium tetrafluoroborate.

The electrolyte layer may especially be a mixture of lithium perchlorate, and oxyethylene and epichloridrine copolymer.

The polymers may also be used without being necessary associated with dissolved salts. This is in particular the case of polyelectrolytes polymers such as sulfonates polystyrenes, polyimidazole chlorides or bromides, polyvinylpyridines, and polyamidopropylsulfonates.

EXAMPLES PROPOSED

Example 1

A solution of polyethylene dioxythiophene (sold under the reference Baytron and available from Bayer) was deposited on a support and electrode layer available from Shieldal (USA) formed of PET covered with electrically-conductive transparent ITO, e.g. over an extent of 3 square centimeters (cm²), and then left to dry so as to form a first active electrochromic layer.

A film of polypyrrole was then deposited by electrophoresis on a second layer of polyethylene terephthalate covered with electrically-conductive transparent oxide. The electropolymerization was performed with an aqueous solution containing lithium perchlorate by using a constant potential of 0.7 V. A second electrode support layer coated with a second active electrochromic layer was obtained.

The electrolyte was made by dissolving 0.015 grams (g) of lithium perchlorate in a mixture of 0.7 g of oxyethylene and epichloridrine copolymer (available from DAISO Co. under the reference EM-2), and 5 milliliters (mL) of tetrahydrofuran. The mixture was then coated on the electrode covered with Baytron®. After two hours of drying at ambient temperature, the backing-electrode covered with polypyrrole was added while exerting pressure in order to obtain the electrosensitive stack. The electrosensitive stack covered an optically-active layer that was constituted by a red-colored film. The device could display a color change between orange/brown and blue/violet by changing the potential between −1.5 V and +1.5 V.

The change in color occurred in less than 10 seconds.

Example 2

This example differs from example 1 by the fact that the first active electrochromic layer was coated so as to form a pattern, e.g. a heart-shaped pattern. Electrical excitation of the device made it possible to change its color, as shown in FIGS. 7A and 7B.

Example 3

This example differs from example 1 by the fact that a mask-forming opaque film, e.g. of color red, was placed on the surface of the electrosensitive stack, which film was cut out so that a pattern, e.g. a star, could be seen. Electrical excitation made it possible to change the color of the pattern defined by the cutout in the mask.

Example 4

This example differs from example 1 by the fact that the layer of Baytron® was deposited in non-uniform manner. The spreader was controlled in such a manner as to have two sides of different height. Color shading could be obtained by changing the potential between −1.5 V and 1.5 V.

Example 5

The multilayer structure of example 1 was applied to a false nail. The layers of Baytron® and of polypyrrole were connected to electrical conductors that were situated on the bottom face of the false nail and at the end of the false nail so as to remain accessible, but without degrading the appearance of the device after application. The electrical conductors were copper plates, each having a surface area of 1 mm².

Example 6

In this example, the multilayer structure of example 1 was used which was connected to an SR 416 button battery that was placed beneath the multilayer structure. An insulating sheet such as a film of polyethylene was inserted into the electrical circuit, which sheet acted as a switch. For nail makeup, the insulating sheet may initially be put into contact with one of the terminals of the battery beneath the device, at the end of a nail.

Example 7

This example differs from example 6 by the fact that the device was provided with a touch-sensitive switch, e.g. of PHAP 3391 type, available from APEM. The switch was suitable for placing beneath the multilayer structure, at the end of a nail.

Example 8

This example differs from example 6 by the fact that an adjustable potentiometer, e.g. CERMET CMS, was inserted into the electrical circuit in order to vary the intensity of the excitation current.

Example 9

This example differs from example 1 by the fact that it included five alternating layers of 5 μm thick cellulose acetobutyrate and 5 μm thick polyethylene, deposited on the surface of the top support layer, so as to form peelable protective films. In order to make it easier to remove each layer, a portion of the cellulose acetobutyrate coating exceeded the application zone a little, so that the top layer presented a tab that made it easy to take hold of the film to be peeled off, without pulling off all of the layers.

Example 10

In this example, the electrochromic device presented, on its surface, a protective layer suitable for being eliminated by makeup removal. The remainder of the device was proof against makeup removal.

The top of the device of example 1 was coated with a layer of ethanol-based varnish (20% Shellac gum, 80% ethanol). Since PET withstands ethanol, it was possible to eliminate the protective layer with an ethanol-based makeup remover without damaging the device. It was then possible, where necessary, to reapply a protective layer using the varnish.

Example 11

An adhesive covered by a 50 μm layer of Dispofix 645 E (available from National Adhesives) was put into contact with the bottom face of the electrochromic device of example 1. Pressure was exerted to encourage adhesion. A protective film for protecting the adhesive was removed on application.

Example 12

3% of Xirona Kiwi-rose goniochromatic pigment (Merck) was added to the first active electrochromic layer of example 1. In that way, the electrochromic effect increased by the optical effect of the goniochromatic pigment was visible to a greater or lesser extent as a function of the excitation state of the electrochromic device.

Example 13

3% Metashine Silver pigment (Nippon Sheet Glass) was added to the first active electrochromic layer of example 1. In that way, the electrochromic effect increased by the optical effect of the metal pigment was colored to a greater or lesser extent as a function of the excitation state of the electrochromic device.

The invention is not limited to the embodiments shown.

The electrochromic device may be light-emitting or non light-emitting.

The expression "comprising a" should be understood as being synonymous with "comprising at least one" unless specified to the contrary.

The invention claimed is:

1. A cosmetic device for applying to human keratinous materials, the device including an electrochromic multilayer structure comprising an electrosensitive stack formed by at least:
   first and second electrode layers, the first and second electrode layers being coatings supported by respective support layers, said support layers being constituted by a single flexible film or an assembly of flexible films;
   first and second active electrochromic layers; and
   an electrolyte layer; and further including:
      an optically-active layer that is superposed, at least in part, on the electrosensitive stack,
      wherein the optically-active layer is at least one of a layer including an effect pigment, a colored layer, a luminescent layer and printing.

2. The device according to claim 1, the optically-active layer being situated on top of the electrosensitive stack.

3. The device according to claim 1, the optically-active layer being situated between two layers of the electrosensitive stack.

4. The device according to claim 1, the optically-active layer being situated beneath the electrosensitive stack.

5. The device according to claim 1, the optically-active layer being colored.

6. The device according to claim 3, the optically-active layer being luminescent and the electrosensitive stack being capable, as a function of its electrical excitation, of blocking, at least partially, at least one optical-excitation wavelength of the optically-active layer.

7. The device according to claim 3, the optically-active layer being photochromic and the electrosensitive stack being capable, as a function of its electrical excitation, of blocking, at least partially, at least one optical-excitation wavelength of the optically-active layer.

8. The device according to claim 1, the optically-active layer extending over the entire extent of the electrosensitive stack.

9. The device according to claim 1, the optically-active layer being discontinuous.

10. The device according to claim 2, the optically-active layer including an interference pigment, a liquid crystal, or an interference pigment and a liquid crystal.

11. The device according to claim 10, the interference pigment comprising a goniochromatic or diffractive pigment.

12. The device according to claim 11, the electrosensitive stack being capable of filtering a color of a color path of the goniochromatic or diffractive pigment.

13. The device according to claim 1, said device being configured to be fastened to a nail.

14. A method of applying makeup to human keratinous materials, wherein the device as defined in claim 1 is fastened to said human keratinous materials.

15. A cosmetic device for applying to human keratinous materials, the device including an electrochromic multilayer structure comprising an electrosensitive stack formed by at least:
   first and second electrode layers;
   first and second active electrochromic layers; and
   an electrolyte layer; and further including:
      an optically-active layer that is superposed, at least in part, on the electrosensitive stack,
      wherein the optically-active layer is situated between two layers of the electrosensitive stack, and
      wherein the optically-active layer is luminescent and the electrosensitive stack is capable, as a function of its electrical excitation, of blocking, at least partially, at least one optical-excitation wavelength of the optically-active layer.

16. A cosmetic device for applying to human keratinous materials, the device including an electrochromic multilayer structure comprising an electrosensitive stack formed by at least:
   first and second electrode layers;
   first and second active electrochromic layers; and
   an electrolyte layer; and further including:
      an optically-active layer that is superposed, at least in part, on the electrosensitive stack,
      wherein the optically-active layer is situated between two layers of the electrosensitive stack, and
      wherein the optically-active layer is photochromic and the electrosensitive stack is capable, as a function of its electrical excitation, of blocking, at least partially, at least one optical-excitation wavelength of the optically-active layer.

17. A cosmetic device for applying to human keratinous materials, the device including an electrochromic multilayer structure comprising an electrosensitive stack formed by at least:
   first and second electrode layers;
   first and second active electrochromic layers; and
   an electrolyte layer; and further including:
      an optically-active layer that is superposed, at least in part, on the electrosensitive stack,
      wherein the optically-active layer is discontinuous.

18. A cosmetic device for applying to human keratinous materials, the device including an electrochromic multilayer structure comprising an electrosensitive stack formed by at least:
   first and second electrode layers;
   first and second active electrochromic layers; and
   an electrolyte layer; and further including:
      an optically-active layer that is superposed, at least in part, on the electrosensitive stack,
      wherein the optically-active layer is situated on top of the electrosensitive stack, and
      wherein the optically-active layer includes an interference pigment, a liquid crystal, or an interference pigment and a liquid crystal.

19. A cosmetic device for applying to human keratinous materials, the device including an electrochromic multilayer structure comprising an electrosensitive stack formed by at least:
   first and second electrode layers;
   first and second active electrochromic layers; and
   an electrolyte layer; and further including:
      an optically-active layer that is superposed, at least in part, on the electrosensitive stack,
      wherein the optically-active layer is situated on top of the electrosensitive stack,
      wherein the optically-active layer includes an interference pigment, a liquid crystal, or an interference pigment and a liquid crystal, and
      wherein the interference pigment comprises a goniochromatic or diffractive pigment.

20. A cosmetic device for applying to human keratinous materials, the device including an electrochromic multilayer structure comprising an electrosensitive stack formed by at least:

first and second electrode layers;
first and second active electrochromic layers; and
an electrolyte layer; and further including:
an optically-active layer that is superposed, at least in part, on the electrosensitive stack,
wherein the optically-active layer is situated on top of the electrosensitive stack,
wherein the optically-active layer includes an interference pigment, a liquid crystal, or an interference pigment and a liquid crystal,
wherein the interference pigment comprises a goniochromatic or diffractive pigment, and wherein the electrosensitive stack is capable of filtering a color of a color path of the goniochromatic or diffractive pigment.

21. A cosmetic device including an electrochromic multilayer structure comprising an electrosensitive stack formed by at least:
first and second electrode layers, the first and second electrode layers being coatings supported by respective support layers, said support layers being constituted by a single flexible film or an assembly of flexible films;
first and second active electrochromic layers; and
an electrolyte layer;
wherein an optically-active layer made of makeup is superposed, at least in part, on the electrosensitive stack.

* * * * *